US007668962B2

(12) United States Patent
Tran et al.

(10) Patent No.: US 7,668,962 B2
(45) Date of Patent: Feb. 23, 2010

(54) SYSTEM AND METHOD FOR CONNECTION FAILOVER USING REDIRECTION

(75) Inventors: Cuong Tran, Los Altos, CA (US);
Partha Seetala, Fremont, CA (US);
Bhavin Thaker, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1041 days.

(21) Appl. No.: 11/052,644

(22) Filed: Feb. 7, 2005

(65) Prior Publication Data

US 2006/0179147 A1 Aug. 10, 2006

(51) Int. Cl.
*G06F 15/16* (2006.01)
(52) U.S. Cl. ................ 709/230; 709/227; 709/238; 370/352; 714/4
(58) Field of Classification Search ............. 709/227, 709/238; 714/4
See application file for complete search history.

(56) References Cited

U.S. PATENT DOCUMENTS

| 6,366,558 | B1 | 4/2002 | Howes et al. | |
|---|---|---|---|---|
| 6,650,641 | B1 * | 11/2003 | Albert et al. | 370/392 |
| 6,871,296 | B2 | 3/2005 | Kashyap | |
| 6,934,875 | B2 | 8/2005 | Kashyap | |
| 6,938,092 | B2 | 8/2005 | Burns | |
| 2003/0005350 | A1 * | 1/2003 | Koning et al. | 714/4 |
| 2004/0268175 | A1 | 12/2004 | Koch | |
| 2005/0108593 | A1 * | 5/2005 | Purushothaman et al. | 714/4 |
| 2006/0168334 | A1 * | 7/2006 | Potti et al. | 709/239 |

OTHER PUBLICATIONS http://www.simplefailover.com/outbox/dns-caching.pdf "DNS Caching and Simple Failover" —JH Software APS Nov. 14, 2006.*
http://www.sonicwall.com/downloads/How_to_Configure_Hardware_Failover_SonicOS_Enhanced_2.5_3.0.pdf "How to Configure Hardware Failover" —Sonicwall.*
Zhang, R., et al, "Efficient TCP Connection Failover in Web Server Clusters," IEEE, 2004, 10 pages; http://www.ieee-infocom.org/2004/migrate-failover.pdf.
Snoeren, A., et al, "Fine-Grained Failover Using Connection Migration," MIT Laboratory for Computer Science, Cambridge, MA 02139, Proceedings of the Third Annual USENIX Symposium on Internet Technologies and Systems (USITS), Mar. 2001; http://nms.lcs.mit.edu/software/migrate/.

(Continued)

*Primary Examiner*—Liangche A. Wang
*Assistant Examiner*—Randy Scott
(74) *Attorney, Agent, or Firm*—Meyertons, Hood, Kivlin, Kowert & Goetzel, P.C.

(57) ABSTRACT

A system for connection failover using redirection includes a primary server comprising a primary connection failover driver (CFD), a shadow server comprising a shadow CFD, and a client. The primary and shadow servers and the client are coupled via a network. The primary server and the client are configured to cooperate to establish a network connection. The primary CFD is configured to redirect a first message packet, targeted for transmission to the client over the network connection, to the shadow server. The shadow CFD is configured to copy contents of the first message packet into a log, and forward the first message packet to the client after the contents have been copied.

14 Claims, 15 Drawing Sheets

OTHER PUBLICATIONS

Alvisi, L., et al, "Wrapping Server-Side TCP to Mask Connection Failures," IEEE Infocom 2001, pp. 1-11.

Fetzer, C., et al, "Transparent TCP/IP based Replication," Department of Computer Science & Engineering, University of California, San Diego, CA 92093-0114, Fastabstract. Proceedings of the 29th IEEE International Symposium on Fault-tolerant Computing, Madison, WI (Jun. 1999) migratory_tcp.pdf: ICDCS 2003 (International Conference On Distributed Computing Systems); http://www.cs.ucsd.edu/~cfetzer.

Sultan, F., et al, "Migratory TCP: Connection Migration for Service continuity in the Internet," Department of Computer Science, Rutgers University, Piscataway, NJ 08854-8019, IEEE, Proceedings of the $22^{nd}$ International Conference on Distributed Computing Systems (ICDCS '02), 2 pages.

Marwah, M., et al, "TCPServer Fault Tolerance Using Connection Migration to a Backup Server," IEEE, Proceedings of IEEE International Conference on Dependable systems and Networks (DSN 2003), 10 pages.

* cited by examiner

SYSTEM AND METHOD FOR CONNECTION FAILOVER USING REDIRECTION

BACKGROUND OF THE INVENTION

1. Field of the Invention

This invention relates to computer systems and, more particularly, to failover of network connections in computer systems.

2. Description of the Related Art

Many business organizations and governmental entities today increasingly rely upon communication networks to provide mission-critical services to both internal and external customers. Large data centers in such organizations may include hundreds of computer servers to support complex mission-critical applications and services required by tens of thousands of customers or clients. The services may be provided over a heterogeneous collection of networks or network segments, including for example intranets and the Internet, using a variety of networking protocols such as the Transmission Control Protocol/internet Protocol (TCP/IP) to provide reliable communication.

In many such environments, services may be provided to clients using relatively long-lived network connections. For example, applications providing multimedia services, applications performing multiple complex database transactions for each connected client, or applications that are used to monitor the state of another application over a long period of time, each may require long-lived connections. Once a connection is established between a client and a server, for example by logging in to a server application, the client typically expects the connection to remain in service until the transactions desired by the client are completed. Inadvertent loss of established connections may often lead to a perception of poor quality of service, which may in turn have adverse business consequences for the organization providing the service. The loss of even short-lived connections in the middle of a transaction may result in similar negative business consequences for service providers.

Established connections may become unusable, or be lost, due to various kinds of errors or faults, including, for example, server overload, server crashes (which may in turn be caused by hardware or software failures at the server), network congestion, denial of service attacks, etc. While a number of different approaches to increasing fault tolerance in general have been taken in the industry, e.g., by configuring clusters of servers, by designing applications to fail over to a backup server upon a failure at a primary server, etc., the problem of providing fault-tolerance for individual network connections has been complicated by a number of factors.

A first complicating factor is the understandable reluctance of service providers to modify existing, working, networking software stacks. The TCP/IP networking stack, for example, has been in use for years, is ubiquitous across most enterprises and the Internet, and has achieved such a level of maturity and stability that most Information Technology (IT) departments and operating system vendors are extremely wary of making any changes to it. A second complicating factor is performance. Providing fault tolerance for network connections at the cost of a substantial decrease in throughput for normal operations (e.g., operations performed in the absence of server failures or crashes), or at the cost of a substantial increase in response time during normal operations, is also often unacceptable.

SUMMARY

Various embodiments of a system and method for connection failover using redirection are disclosed. According to a first embodiment, a system includes a primary server comprising a primary connection failover driver (CFD), a shadow server comprising a shadow CFD, and a client. The primary and shadow servers and the client are coupled via a network. The primary server and the client are configured to cooperate to establish a network connection, for example using a secure and reliable protocol such as the Transmission Control Protocol (TCP). The primary CFD is configured to redirect a first message packet, targeted for transmission to the client over the network connection, to the shadow server. The shadow CFD is configured to copy contents of the first message packet into a log, and forward the first message packet to the client after the contents have been copied.

In one embodiment, the primary CFD may be implemented in a layer below a transport layer of a networking software stack in use at the primary server, and the shadow CFD may be implemented in a corresponding layer below a transport layer of a networking software stack in use at the shadow server. The primary CFD may be configured to redirect the first message packet according to a protocol that may not require an acknowledgment of the redirected packet to be sent by the shadow server. In one specific embodiment, the User Datagram Protocol (UDP) may be used for the redirected message packet.

In another embodiment, in response to a client message packet received from the client at the primary server, the primary CFD may be configured to transmit a copy of the client message packet to the shadow server. The copy of the client message packet may be transmitted asynchronously to the shadow server with respect to the delivery of the client message packet to a server application at the primary server. On receiving the copy of the client message packet, the shadow CFD may be configured to copy the contents of the client message packet into the log. In response to the reception of the client message packet at the primary server, an acknowledgment may be prepared (for example at a transport layer of the primary server's networking software stack) for transmission to the client. The primary CFD may also be configured to redirect the acknowledgment packet to the shadow server. In some implementations, the acknowledgment packet may include data sent from the primary server to the client, i.e., the acknowledgment may be combined with a data transmission. Both the copy of the client message packet, and the redirected acknowledgment may be transmitted to the shadow server in accordance with a protocol that may not require an acknowledgment from the shadow server. On receiving the acknowledgment packet at the shadow server, the shadow CFD may be configured to verify that the client message packet has been received at the shadow server before forwarding the acknowledgment to the client. Thus, for example, in some embodiments, if the copy of the client message packet is lost or dropped during a its transmission from the primary server to the shadow server, a corresponding acknowledgment packet may not be forwarded to the client until the copy of the client message packet is retransmitted to, and successfully received at, the shadow server. At least a portion of the log may be maintained within volatile memory in some embodiments. In one specific embodiment, at least a subset of the log may be asynchronously copied to non-volatile storage.

According to one embodiment, the network connection between the primary server and the client may have been established to allow communication between a server application and a client application. In response to a detection of a failure, such as a system crash at the primary server, the shadow CFD may be configured to re-establish the network connection using connection state information (such as packet sequence numbers) derived from the log, to allow communication between a failover version of the server application and the client. Some server applications may be configured for stateless failover, where, for example, the shadow CFD may be configured to re-establish one or more connections automatically, without waiting for explicit instructions from the failover version of the server application. Other server applications may be configured for stateful failover, and may explicitly request the re-establishment of one or more connections and/or the replay of one or more message transmissions to the client.

Figure 1:
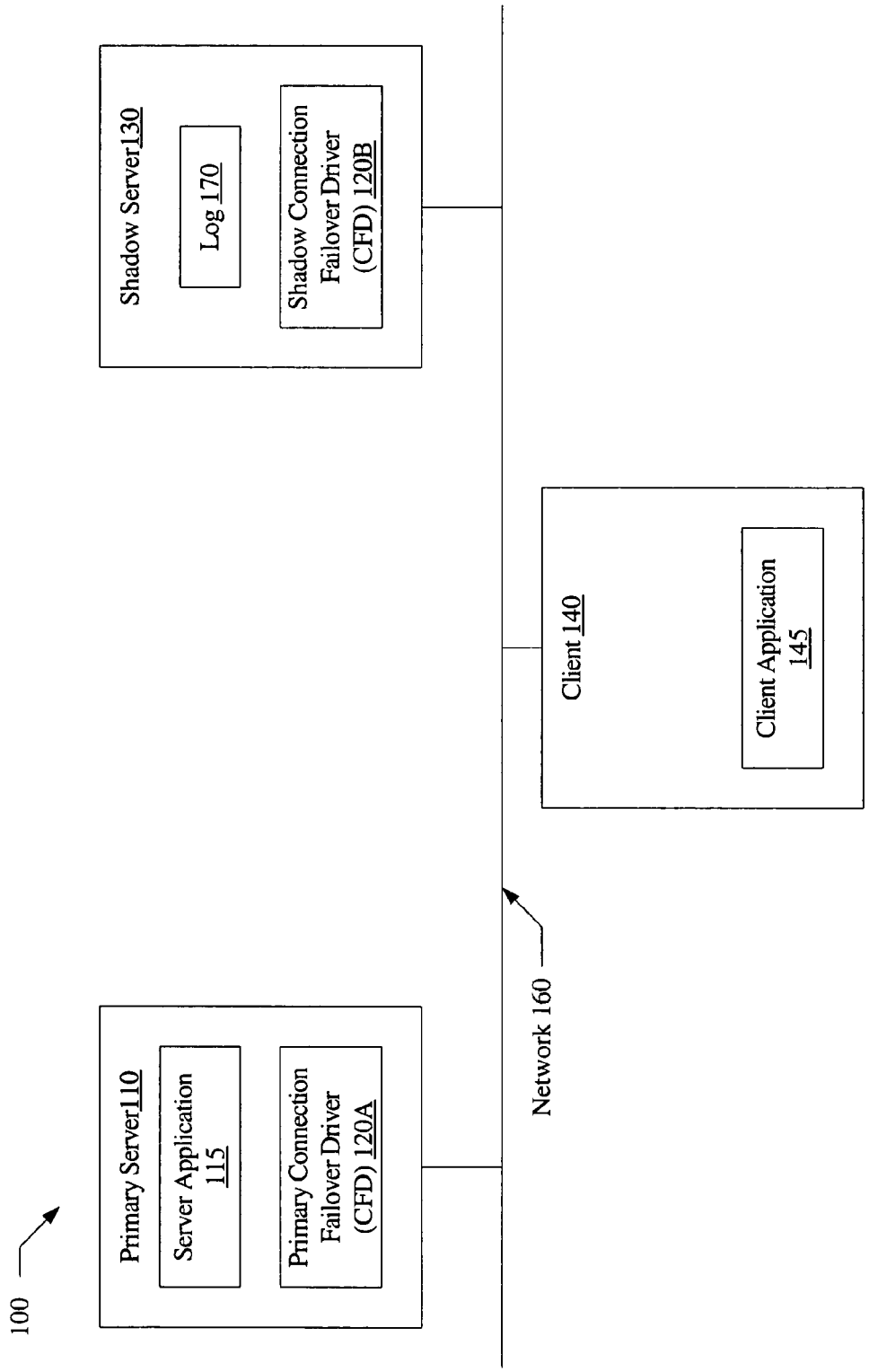
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a primary server 110, a shadow server 130, and a client 140 coupled by a network 160. Primary server 110 includes a server application 115 and a primary connection failover driver 120A. The term "connection failover driver" may be abbreviated hereinafter as "CFD". Shadow server 130 includes a shadow CFD 120B with access to a log 170. Primary server 110 and client 140 may be configured to cooperate to establish a network connection, for example using a reliable, connection-oriented networking protocol such as the Transmission Control Protocol (TCP). A client application 145 may be configured to use the network connection for communication with server application 115 over network 160 in order to obtain one or more services supported by server application 115. As part of such communication, server application 115 may be configured to generate a message packet targeted for transmission over the network connection to client application 145 at client 140. Primary CFD 120A may be configured to intercept the message packet and redirect it to the shadow server 130. Shadow CFD 120B may be configured to receive the redirected message packet, copy its contents to log 170, and forward the message packet to the client 140. To the client 140, the forwarded message packet may appear to have been sent directly from the primary server in some embodiments; e.g., the client 140 may be unaware of the redirection of the packet from the primary server, and the forwarding of the message packet by shadow server 130. In addition, in some embodiments, no configuration or software changes may be required at the client 140 to support the redirection and forwarding of message packets, or for saving the contents of the message packets in the log 170. Further details of the functions provided by primary CFD 120A and shadow CFD 120B during communications in both directions between primary server 110 and client 140, and in response to failures at primary server 110, are provided below.

Server application 115 may be any type of application configured to transmit data over a network. In some embodiments such as the embodiment depicted in FIG. 1, server application 115 may be configured to provide services according to a client-server paradigm to one or more client applications 145, while in other embodiments, server application 115 may be configured to transmit data over network 160 to one or more peer applications in a peer-to-peer architecture. In one embodiment, for example, server application 115 may be a network management application, configured to monitor the state of numerous networking devices such as switches, routers, and the like, and to provide periodic or on-demand state updates to one or more client applications 145. The network management server application 115 may be responsible for monitoring networking devices within a single campus, or in a more distributed environment such as a multi-campus network or across multiple data centers physically located in multiple cities or multiple countries. Its client applications 145 may also be either centrally located or geographically distributed. In another embodiment, server application 115 may be a distributed multimedia server or other content server configured to provide client applications 145 with content such as audio and/or video files, or a server configured to provide Voice Over IP (VOIP) services such as long-distance or local telephone services. In some embodiments, server application 115 may be configured to provide equity trading or other financial or banking-related services. In other embodiments, server application 115 may be an application server (such as a Jave 2 Enterprise Edition (J2EE) server) configured to provide services for a number of higher-level applications such as content subscription services, ticketing services, etc., that may be deployed at the application server, and/or may provide middleware services allowing client applications 145 to access data managed at back-end database servers. Server application 115 may provide cluster management services in some embodiments, for example to help manage a number of other servers configured as a cluster. It is noted that the technique of redirecting a message packet to a shadow server, and the shadow server forwarding the message packet to a destination, may be used for client-to-server communications in some embodiments, as well as, or instead of, being used for server-to-client communications. In addition, in some embodiments, the technique may also be used for communications between peer applications (e.g., in a peer-to-peer architecture rather than a client-server architecture).

Client application 145 may be any application configured to receive data from another application, such as server application 115, over a network 160. For example, a client application 145 may include a network management client application providing status on network devices to one or more users via a graphical user interface (GUI), an audio or video playback application, a VOIP subscriber application, etc. In some embodiments, a primary server 110 may be configured to concurrently support hundreds or thousand of clients 140. Client applications 145 accessing a single server application 115 may be executed at widely distributed clients 140. Data center administrators or IT administrators may have some control over the server-side operating environment (e.g., hardware and software resources and configurations in use at the primary server 110 and at the shadow server 130) in some embodiments, but may have limited or no control on client-side operating environments.

Network 160 may be implemented using any of a number of different hardware and software technologies in different embodiments. For example, in one embodiment, at least a portion of network 160 (such as a portion used for communication between primary server 110 and shadow server 130) may be a Local Area Network (LAN), which may be implemented using any desired copper-based networking links such as various versions of Ethernet and/or optical fiber-based networking hardware. In one specific embodiment, primary server 110 and shadow server 130 may be configured with networking addresses within a single subnet, e.g., within a portion of a networking address space defined by a subnet address and a subnet mask, to simplify routing of messages between primary server 110 and shadow server 130. In other embodiments, at least a portion of network 160 may be a Metropolitan Area Network (MAN), a Wide Area Network (WAN), or may include links of a distributed network such as the Internet. In some embodiments, network 160 may include one or more wireless links. Any desired reliable, connection-oriented network protocol, such as TCP or SCTP (Stream Control Transmission Protocol) may be utilized for the network connection between primary server 110 and client 140. Typically, a logical communication, such as a file transfer, between two endpoints (such as a first network socket at a sender and a second network socket at the recipient) of a connection established according to such a protocol may consist of an ordered sequence of message packets. Message packets may be sent in either direction over the connection, and acknowledgments for received message packets may be sent by the recipient to the sender, e.g., piggybacked or included within other message packets or as separate acknowledgment packets.

A technique called "positive acknowledgment with retransmission" may be used to ensure reliable transmission in both directions in accordance with the reliable network protocol. In a simple form of positive acknowledgment with retransmission, when a recipient receives a packet, the recipient sends an acknowledgment message to the sender. The sender keeps a record of each packet it sends and waits for an acknowledgment before sending the next packet. The sender also starts a timer when it sends a packet and retransmits the packet if the timer expires before an acknowledgment arrives. More efficient versions of this basic "positive acknowledgment with retransmission" technique are typically employed in practice, where, for example, a sender may send multiple packets before receiving an acknowledgment for a given packet, and/or acknowledgments for a number of consecutive packets may be sent in a single message. As described below in further detail, in some embodiments, primary CFD 120A and shadow CFD 120B may be configured to utilize features of a "positive acknowledgment with retransmission" technique that may be in use for the network connection between primary server 110 and client 140, to also respond to loss or delay of packets redirected from the primary server 110 to the shadow server 130.

According to one embodiment, primary CFD 120A and shadow CFD 120B may each be implemented as a software layer or module configured to interact with an existing layered networking software stack within an operating system in use at primary server 110 and/or shadow server 130. Further details on the interactions between the CFDs 120A and 120B, and the interactions of the CFDs and the networking software stacks in use at primary server 110 and shadow server 130, are provided below for various embodiments. Log 170 may be implemented using any of a number of different technologies in different embodiments. For example, in one embodiment, log 170 may be maintained within volatile storage such as any desired form of magnetic random access memory (RAM), while in other embodiments, log 170 may be implemented using persistent storage or in a combination of volatile and persistent storage.

Figure 2:
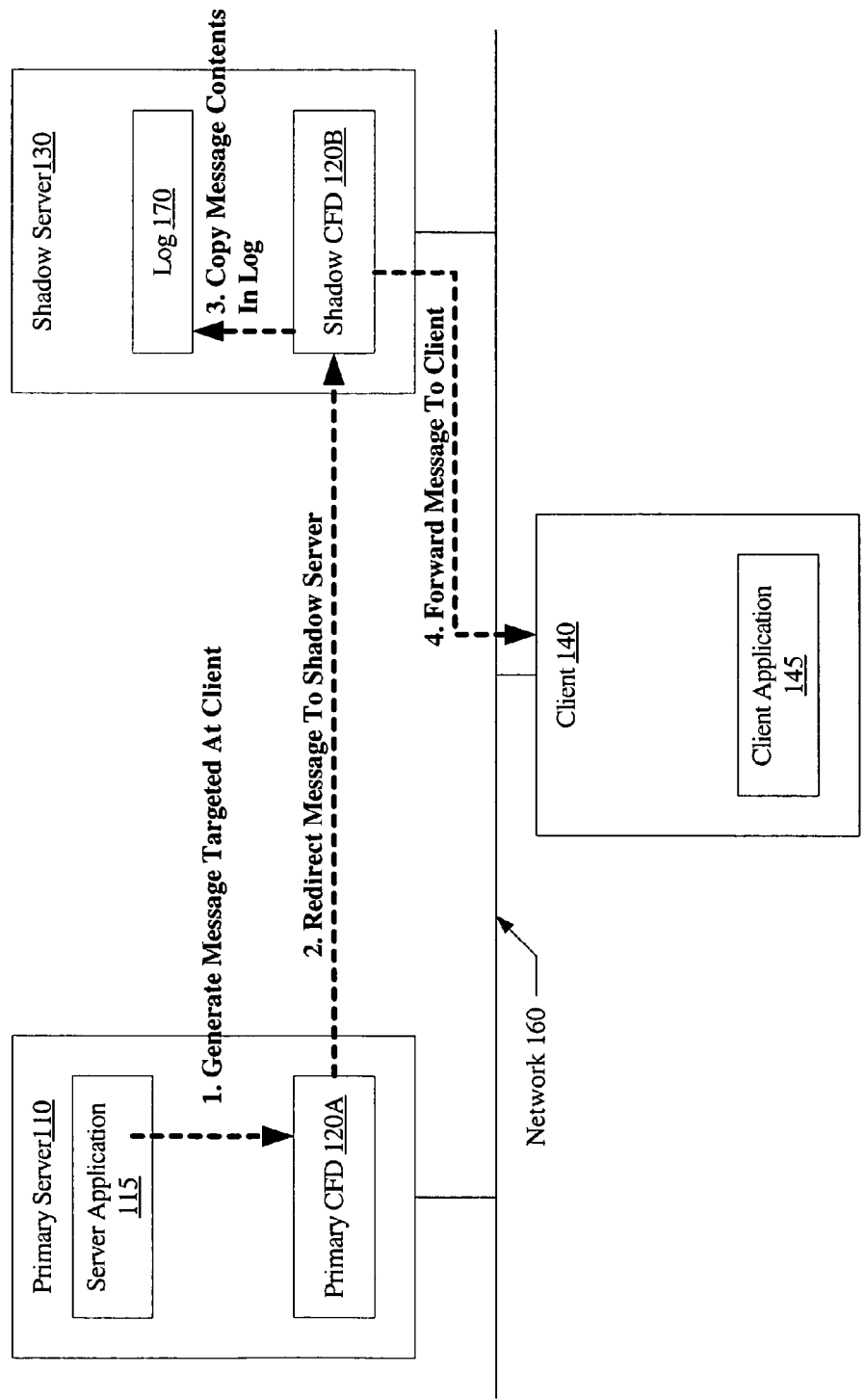
FIG. 2 is a block diagram illustrating aspects of the operation of a primary connection failover driver (CFD) and a shadow CFD during a communication from a primary server to a client, according to one embodiment.

FIG. 2 is a block diagram illustrating aspects of the operation of primary CFD 120A and shadow CFD 120B during a communication from primary server 110 to client 140, according to one embodiment. Server application 115 may be configured to generate a message packet targeted for transmission to the client 140, as indicated by the arrow labeled "1" in FIG. 2. The message packet may be generated, for example, in response to an earlier request received at server application 115 from client application 145, or may be part of a communication originated at server application 115 without an explicit request having been received from client application 145. The message packet may be intended for transmission over the network connection previously established between the primary server 110 and client 140, and may be formatted in accordance with the network protocol used for the established connection. For example, the message packet may include one or more header regions containing control information, and a body or payload region including the actual data to be sent to the client 140. The header regions may include, for example, destination addressing information formatted in accordance with the network protocol in use for the connection, sequence numbers and/or acknowledgement numbers, window sizes, checksum values, header and data lengths, etc. In some embodiments, each layer within a networking software stack may add (e.g., as a prefix) its own header region containing control information intended for use at a corresponding layer at the recipient. Further details on various layers that may be included within a networking software stack are provided below, in conjunction with the descriptions of FIG. 5, FIG. 6 and FIG. 7.

Primary CFD 120A may be configured to intercept the message packet before it is transmitted over the network 160 to client 140, and to redirect the message packet to shadow server 130, as indicated by the arrow labeled "2" in FIG. 2. In some embodiments, primary CFD 120A may be configured to detect that a given message packet is a candidate for redirection based on an encoding that may have been included within the message packet by server application 115 or by an intermediate software layer between server application 115 and primary CFD 120A. In other embodiments, configuration parameters such as host and/or port numbers, which may for example be specified in a configuration file, may be used to specify the set of message packets that are candidates for redirection: e.g., all messages sent from a specified (host, port) combination may be designated for redirection. Primary CFD 120A may be configured to modify one or more destination indicators (such as a destination address in a network link layer header of the message packet) in order to redirect the message packet. In one embodiment, primary CFD 120A may also be configured to modify one or more additional fields of a header within the message packet (such as a protocol identifier) to indicate (e.g., to a recipient CFD such as shadow CFD 120B) that the message packet is being redirected. After the message packet has been modified for redirection, it may be physically transmitted on the network 160 (e.g., by a network interface card (NIC) driver), and may be received at shadow server 130.

At shadow server 130, a NIC driver may be configured to read the contents of the message packet from the network 160, and to provide the contents to other software layers of the networking software stack in use at shadow server 130. Shadow CFD 120B may be configured to receive the message packet, e.g., from the NIC driver, and copy the contents of the message packet into the log 170, as indicated by the arrow labeled "3" in FIG. 2. After the contents of the message packet have been copied, shadow CFD 120B may be configured to forward the message packet to the client 140, as indicated by the arrow labeled "4" in FIG. 2. The redirection by shadow CFD 120B may include undoing the changes that may have been performed on the message packet by primary CFD 120A in some embodiments: e.g., by re-setting a destination address to that of the client. In another embodiment, shadow CFD 120B may also be configured to reset or modify an encoding (such as a network protocol number within a header) that was earlier used by primary CFD 120A to identify the message packet as a redirected message packet, e.g., to a value that may be typically set for the encoding in accordance with the protocol used for the network connection established between the primary server 110 and the client 140.

It is noted that in some embodiments, neither shadow CFD 120B, nor any other layer of networking software at shadow server 130, may be configured to send an acknowledgment to primary server 110 indicating that the redirected message packet has been received at shadow server 130. That is, the redirection of the message packet to shadow server 130 may be performed in accordance with a protocol that does not require an acknowledgment from the shadow server of a reception of the message packet. In some embodiments, an existing connectionless, potentially unreliable network protocol such as User Datagram Protocol (UDP) may be used for the redirected message packet. In other embodiments, a custom protocol, for example at the data link layer of a networking software stack, may be used instead. The use of a protocol that does not require acknowledgments may help to lower the performance impact of the redirection and copying of the message packet in log 170, as perceived at the client 140 and the primary server 110. In other embodiments, the redirected message packet may be transmitted or tunneled to the shadow server according to a reliable protocol (e.g., contents of the message packet may be included or encapsulated within the body of a packet formatted according to a reliable protocol). In such embodiments, for example, shadow CFD 120B may be configured not to send any acknowledgment of the reception of the redirected package to primary server 110, while another layer of a networking software stack at shadow server 130 (such as a transport layer) may be configured to send an acknowledgment back to primary server 110 in accordance with the reliable protocol.

As described above, shadow CFD 120B may be configured to return the message packet header (or headers) to the state the header (or headers) would be in, had the message packet not been redirected by the primary CFD 120A. Also, neither primary CFD 120A nor shadow CFD 120B may be configured to modify the contents of the body of the message packet. Consequently, when client 140 receives the message packet forwarded by the shadow server 130, the message may appear to have been sent directly from the primary server 110. Thus, during normal operation, the client 140 may not be made aware of the redirection of the message packet, or even of the existence and functionality of the shadow server 130B. One or more layers of a networking software stack in use at client 140 may transfer the message packet to client application 145.

By copying the contents of successive message packets targeted for client 140 from server application 115 in log 170, shadow CFD 120B may ensure that a record of the message traffic from the primary server 110 to the client 140 is maintained at shadow server 130. In addition to maintaining a record of message traffic from the primary server 110 to client 140, shadow server 130 may also be configured to maintain a similar record for message traffic from the client 140 to primary server 110, as described in conjunction with the description of FIG. 3 below. As the contents of the message packets saved in log 170 may include connection state information such as protocol-specific sequence numbers, acknowledgment numbers, window sizes, and the like, such a record of message traffic may later be used to recover connection state in the event of a failure at primary server 110, as described in further detail below. As no acknowledgments for the redirected message packet may be required from shadow server 130 by primary server 110 in some embodiments, primary server 110 may be configured to proceed to other tasks as soon as the message packet has been transmitted by primary CFD 120A, without waiting for any synchronous responses to the redirected message from shadow server 130.

Figure 3:
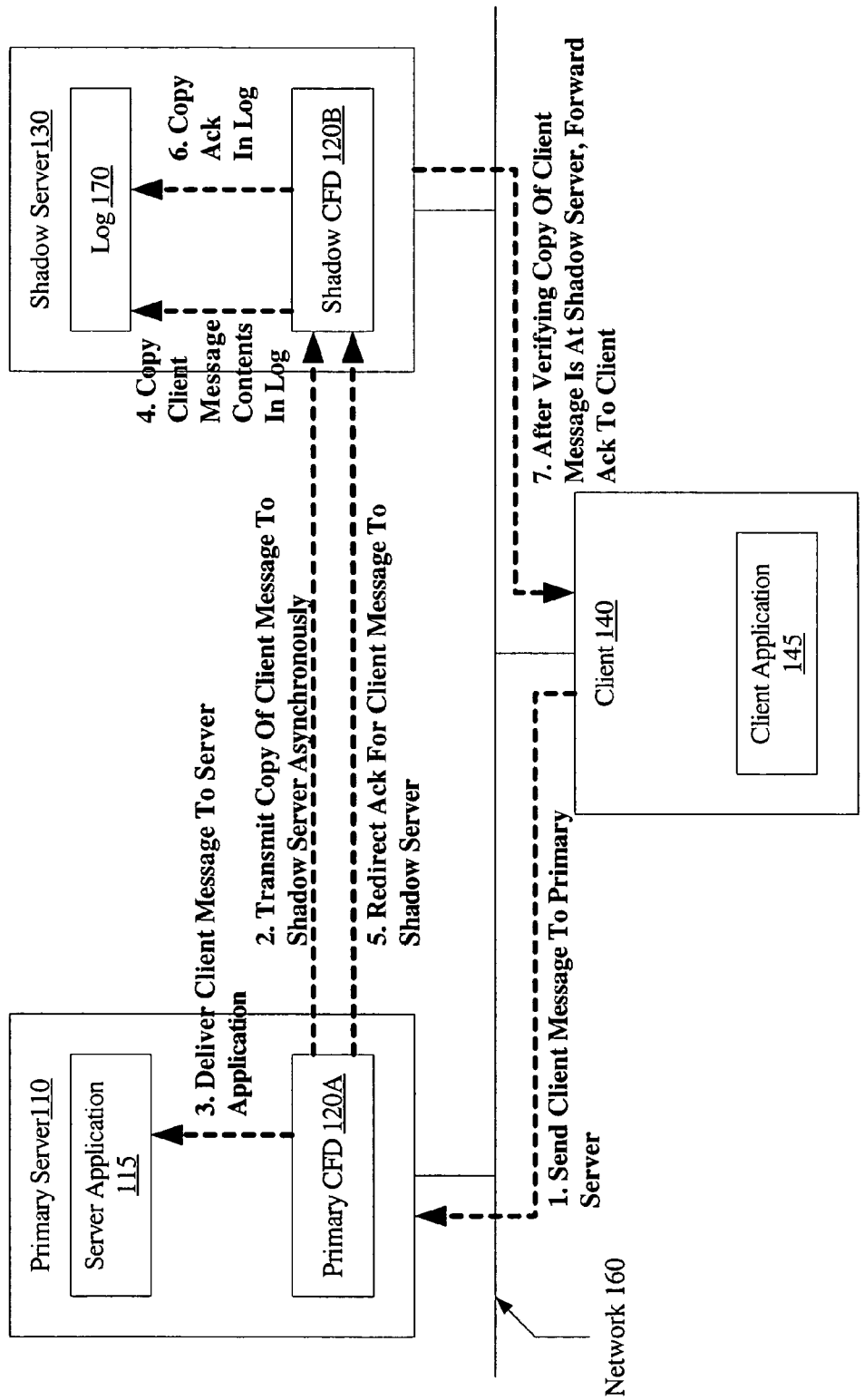
FIG. 3 is a block diagram illustrating aspects of the operation of a client, a primary CFD and a shadow CFD during a communication from the client to a primary server, according to one embodiment.

FIG. 3 is a block diagram illustrating aspects of the operation of client 140, primary CFD 120A and shadow CFD 120B during a communication from client 140 to primary server 110, according to one embodiment. The client application 145 may generate a client message packet for transmission to the primary server application 115, e.g., in response to an earlier message received from the primary server 110 as described above. In different embodiments, the client message packet may include data being sent from the client application 145 to the server application 115, may consist of an acknowledgment to an earlier server-generated message, or may include data as well as one or more acknowledgments. It is noted that in the depicted embodiment, a native or standard networking software stack may be used at client 140 without modification, e.g., without the addition of a connection failover driver (CFD. The client message packet may be sent over network to the primary server 110 in accordance with the protocol in use for the client-server connection established earlier between the client 140 and the primary server 110, as indicated by the arrow labeled "1" in FIG. 3. Thus, unlike in the case of the message packet originated from the primary server 110, the client message packet may be transmitted to primary server 110 without any header modification or redirection.

The client message packet may be received at primary server 110, e.g., by a NIC driver, and provided to other layers (such as primary CFD 120A) of the networking software stack at the primary server 110. Primary CFD 120A may be configured to transmit a copy of the client message packet to the shadow server 130, as indicated by the arrow labeled "2" in FIG. 3, and to the provide the client message packet to other layers of the networking software stack for eventual delivery to server application 115, as indicated by the arrow labeled "3". In some embodiments, the transmission of the copy of the client message packet to shadow server 130 may be asynchronous with respect to the delivery of the client message to the remaining layers of the networking software stack and server application 115. That is, one or more operations corresponding to the arrow labeled "2" of FIG. 3 may be performed in parallel with, or earlier than, one or more operations corresponding to the arrow labeled "3". When the shadow server receives the copy of the client message packet, the shadow CFD 120B may be configured to copy the contents of the client message packet in log 170, as shown by the arrow labeled "4" in FIG. 3. As in the case of the redirected message packet described earlier, in some embodiments no acknowledgment of the receipt of the client message packet may be sent from shadow server 130 to primary server 110, and no such acknowledgment may be expected at primary server 110. The copy of the client message packet may also be sent to the shadow server 130 according to a protocol that does not require an acknowledgment in some embodiments, such as a connectionless, potentially unreliable, protocol like UDP. In one embodiment, the same network endpoint or socket that was used for the redirected message packet may be used for the copy of the client message packet. As noted above, shadow CFD 120B may be configured to copy the contents of the client message packet to log 170 in order to maintain a record of the state of the connection and the message traffic in both directions between client 140 and primary server 110. Connection state information maintained in log 170 may later be used for connection re-establishment in the event of a failure, as described below in further detail. For example, during connection re-establishment, shadow CFD 120B may be configured to simulate the behavior of client application 145 by re-sending data and/or control messages (whose contents may be derived from log 170) sent earlier to the server application 115 from the client application. Similarly, during connection re-establishment, shadow CFD 120B may be configured to simulate the behavior of server application 115 by sending message packets with appropriate sequence numbers, acknowledgment numbers and/or message data (also derived from log 170) to client application 145.

In response to the client message packet, an acknowledgment may be generated at primary server 110 for transmission to the client 140, e.g., in accordance with the connection-oriented reliable network protocol in use for the connection established between client 140 and primary server 110. The acknowledgment may be prepared for transmission to client 140 either as part of a message packet, or may be sent as a separate acknowledgment packet. Just as the primary CFD 120A may be configured to intercept the message packet described in FIG. 2, primary CFD 120A may also be configured to intercept the packet containing the acknowledgment, and redirect it to shadow server 130, as shown by the arrow labeled "5" in FIG. 3. Similar techniques, such as a modification of destination address, may be used by primary CFD 120A for the redirection of the acknowledgment packet as were used for the redirection of the message packet described in conjunction with the description of FIG. 2 above. Also, no acknowledgment may be expected by primary server 110 to a receipt of the redirected acknowledgment packet at shadow server 130 in some embodiments, and shadow server 130 may be configured not to send any such acknowledgment in such embodiments. In other embodiments, the copy of the client message packet and/or the redirected acknowledgment packet may be sent from primary server 110 to shadow server 130 in accordance with a reliable protocol.

On receiving the redirected acknowledgment (which may be part of a message packet, as noted earlier, or a separate packet), shadow CFD 120B may be configured to copy contents of the packet containing the acknowledgment to the log 170 as well, as indicated by the arrow labeled "6" in FIG. 3. In accordance with the connection-oriented protocol (which may implement a "positive acknowledgment with retransmission" technique as described above) in use for the connection established between the primary server 110 and the client 140, the client 140 may expect to receive the acknowledgment prepared at the primary server 110. After verifying that the contents of the client message packet for which the acknowledgment was generated have been received and/or saved at shadow server 130 (e.g., after verifying that the client message packet contents have been copied to log 170), shadow CFD 120B may forward the packet containing the acknowledgment to client 140, as indicated by the arrow labeled "7" in FIG. 3. In this way, shadow CFD 120B may be configured to ensure that an acknowledgment is received at client 140 only if the corresponding client message (i.e., the client message in response to which the acknowledgment was prepared) has been recorded at log 170. Once again, forwarding techniques similar to those described above in conjunction with the description of FIG. 2 (such as restoring the initial destination address and/or a protocol number that may have been modified by primary CFD 120A) may be used by shadow CFD 120B. The forwarded acknowledgment may appear to the client 140 as though it were sent directly from primary server 110.

As described above, using the techniques illustrated in FIG. 2 and FIG. 3, shadow CFD 120B may be configured to maintain a record of message and acknowledgment traffic in both directions between primary server 110 and shadow server 140 in log 170 in some embodiments. Messages generated at client 140 may be transmitted undisturbed, i.e., without modification or redirection, to primary server 110. Messages generated at primary server 110 may experience a small delay due to the redirection, logging and forwarding through shadow server 130A. The lack of a requirement for acknowledgments from shadow server 130 to primary server 110 may allow throughput for server-to-client message traffic to be only minimally impacted in some embodiments, and may also minimize the network-related processing overhead (for example, relative to the use of a protocol requiring explicit or even asynchronous acknowledgments). In addition, by using optimizing techniques such as maintaining log 170 in a memory allowing efficient access, and by maintaining shadow server 130 in close proximity to primary server 110 (e.g., by ensuring that a minimal number of network hops are required for data to be transferred between primary server 110 and shadow server 130), the delay experienced in redirecting, logging and forwarding messages from primary server 110 to client 140 may be minimized.

Typically, even though a potentially unreliable protocol may be used for the redirected and copied packets sent by primary CFD 120A to shadow CFD 120B, only a very small fraction of the traffic may actually be lost. Client message copies or redirected messages or acknowledgments that may be lost due to the unreliable nature of the protocol may result in a temporary throttling of the message flow between the primary server 110 and the client 140, and/or in a few extra retransmissions, e.g., due to a "positive acknowledgment with retransmission" technique that may be in use for the network connection between the client 140 and primary server 110. For example, if a redirected message packet P1 from the primary server 110 is lost during its transmission to shadow server 130, P1 will not be forwarded to the client 140, so no acknowledgement for P1 will be received by primary server 110. Consequently, in accordance with the reliable network protocol over which P1 was initially to be sent, primary server 110 may eventually retransmit P1. Similarly, if the copy of a client message packet P2 is dropped during a transmission to shadow server 130, shadow CFD 120B may not forward the acknowledgment corresponding to P2 to client 140 (as noted above, before forwarding an packet containing an acknowledgment for a client message packet, shadow CFD 120B may be configured to verify that the client message packet has been received and/or written to log 170). If no acknowledgment for P2 is received by client 140, client 140 may eventually retransmit P2 in accordance with the reliable network protocol. Finally, if a redirected acknowledgment packet P3 corresponding to a client message packet P2 is lost or dropped before it reaches shadow CFD 120B, shadow CFD 120B may also not forward P3 to client 140, once again causing an eventual retransmission of P2, which would in turn cause a regeneration and redirection of another acknowledgment packet at primary server 110.

Thus, shadow CFD 120B may be configured to utilize features of the reliable network protocol established between client 140 and primary server 110 (e.g., the feature of positive acknowledgment with retransmission) to manage potential loss of data due to unreliable transmissions between primary server 110 and shadow server 130. In addition to loss of data, a connectionless or potentially unreliable protocol in use between primary server 110 and shadow server 130 may also result in duplicated or out-of-order packets in some embodiments. Shadow CFD 120B may be configured to simply ignore duplicated packets (e.g., if the contents of a newly-received packet are already in log 170, shadow CFD 120B may discard the newly-received packet). Out-of-order packets may be handled gracefully by shadow CFD 120B using sequence number information that may be contained in the packets in some embodiments (e.g., shadow CFD 120B may be configured to store redirected packets that are received out of order within log 170, but to only forward them to client 140 in sequence). In other embodiments, shadow CFD 120B may be configured to drop or ignore out-of-order packets received from primary server 110, which may result in eventual retransmissions in accordance with the reliable network protocol.

In some embodiments, when a redirected acknowledgment packet is received at shadow server 130, and shadow CFD 120B detects that the copy of the corresponding client message packet has not yet been received at shadow server 130, shadow CFD 120B may be configured to send a notification to primary CFD 120A indicating that the copy of the client message packet has not been received. In some implementations, shadow CFD 120B may be configured to send such a notification to primary CFD 120A after a configurable time interval has passed since the redirected acknowledgment packet was received. In response to the notification, in some embodiments, primary CFD 120A may be configured to resend the copy of the client message packet. In this way, in such embodiments, shadow CFD 120B may be configured to actively ensure that message and acknowledgment packets flow efficiently and smoothly between the primary server 110 and the client, instead of relying on positive acknowledgment with retransmission as described above to throttle acknowledgments and eventually cause retransmissions. In other embodiments, shadow CFD 120B may be configured to notify the primary CFD 120A when it detects a missing redirected acknowledgment packet; e.g., when a copy of a client message packet is received at shadow server 130, but no corresponding redirected acknowledgment packet is received at the shadow server within a configurable time interval. Such notifications of expected redirected acknowledgment packets and/or expected copies of client message packets may be sent to primary server 110 over a reliable connection (e.g., a connection used for exchanging control information between primary CFD 120A and shadow CFD 120B) in some embodiments, and via an unreliable protocol in other embodiments.

Figure 4:
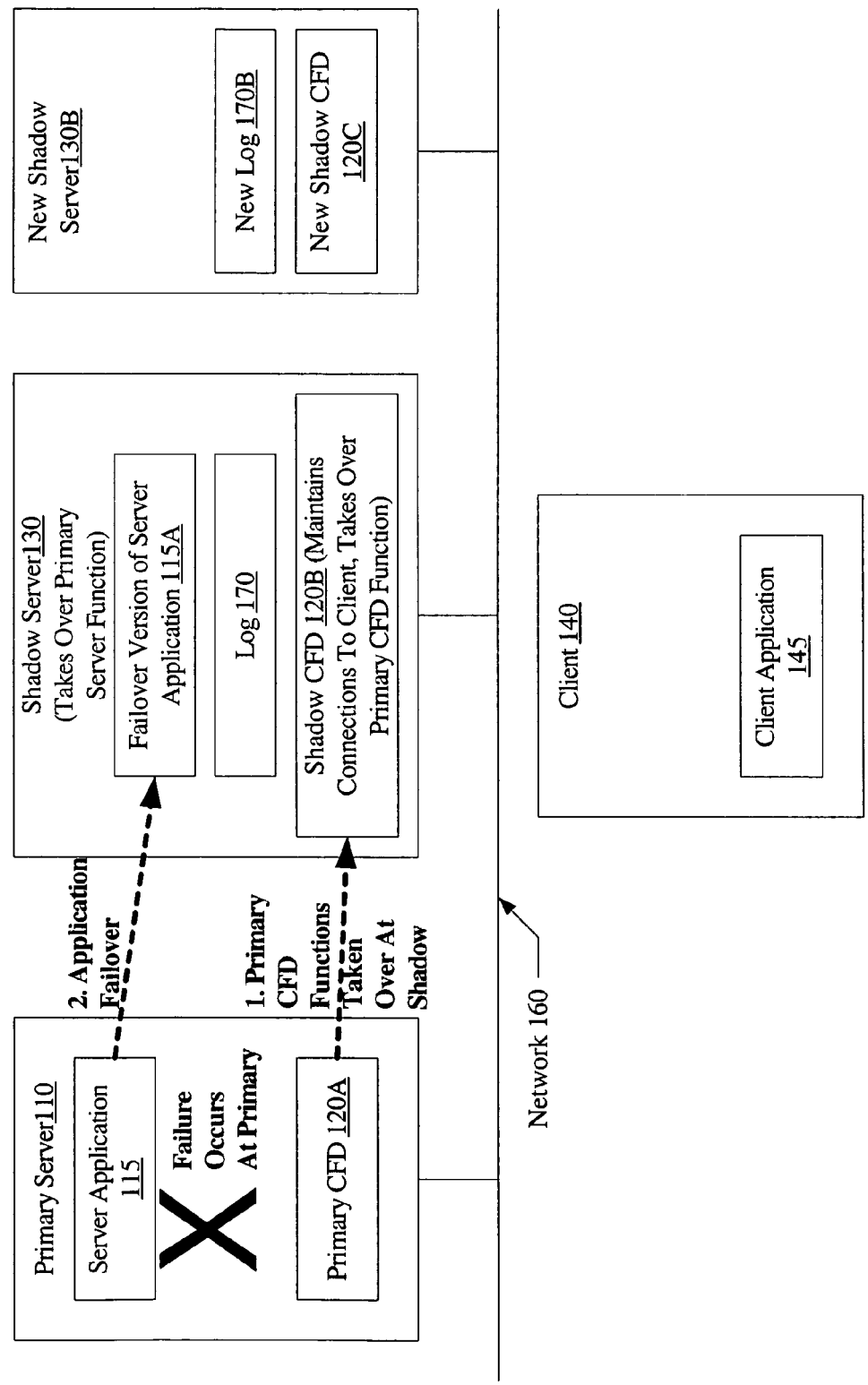
FIG. 4 is a block diagram illustrating aspects of operations that may be performed at a shadow server in response to a detection of a failure, according to one embodiment.

FIG. 4 is a block diagram illustrating aspects of operations that may be performed at shadow server 130 in response to a detection of a failure, according to one embodiment. Any of a number of different types of failures may affect communication over a network connection established between a primary server 110 and a client 140. Such failures may be caused, for example, by one or more failures of hardware and/or software components at either end of the connection, or by one or more hardware or software failures in the network connecting the primary server 110 to the client, or due to excessive congestion in the network, etc. While the operations shown in FIG. 4 may be performed upon a detection of a failure at the primary server 110, similar operations may also be performed in response to other types of failures in other embodiments.

If a failure occurs at primary server 110, it may be detected at shadow server 130 using any of a number of different techniques in different embodiments. For example, in one embodiment, as described in further detail below in conjunction with the description of FIG. 8, each CFD such as primary CFD 120A or shadow CFD 120B may include a membership module configured to maintain information on the availability status of other CFDs. In such an embodiment, shadow CFD 120B may, for example, be configured to periodically exchange heartbeat or "I-am-alive" messages with the primary CFD 120A, and to infer that primary server 110 has failed if one or more heartbeat messages are not received from primary CFD 120A within a specified time period. Heartbeat messages and other control information may be exchanged between CFDs over a reliable connection in some embodiments. That is, in such embodiments, control information may be transferred between primary CFD 120A and shadow CFD 120B using a reliable, connection-oriented network protocol that requires messages to be acknowledged, while redirected server-to-client message and acknowledgment packets may be transferred using a protocol that does not require acknowledgments. Other techniques for failure detection may be used in some embodiments, such as integration with a cluster manager, external heartbeat management software, and the like.

Upon a detection of a failure at primary server 110, shadow CFD 120B may be configured to use the connection state information to take over the network connections previously established between primary server 110 and client 140, as illustrated by the arrow labeled "1" in FIG. 4. In addition, a failover version 115A of server application 115 may be configured to provide the services previously provided by the server application from primary server 110, as indicated by the arrow labeled "2" in FIG. 4. Shadow CFD 120B may be configured to maintain the connections that had been established between the primary server 110A and the client 140, in such a way that the failure of the primary server 110 is not detected by client 140, and to transparently re-establish communication between the failover version 115A of the application and the client 140. Shadow CFD 120B may be configured to use information previously saved in log 170 (such as sequence numbers, acknowledgment numbers, window sizes, etc.), for example to simulate the client to the failover application version 115A and to simulate the application to the client 140A, during failover and recovery. In some embodiments, as part of the transparent application-level recovery of connections being protected by the logging of message contents in log 170, failover version 115A of the application may be assigned one or more new connection endpoints (e.g., sockets) for use in communicating with the client 140. In such embodiments, shadow CFD 120B may be configured to provide network address translation (NAT) to translate a network address (e.g., a port number) and/or sequence numbers (e.g., TCP or other transport level sequence numbers) associated with newly assigned endpoints to match the network address and/or sequence numbers previously saved in log 170. The translation may mask out changes to the network address and/or sequence numbers, so that the failover of application 115 may be transparent to client 140 in such embodiments: e.g., client 140 may continue its communication with the application as though application failover had not occurred.

In some embodiments, server application 115 may be configured to maintain application state information in a persistent storage area accessible from shadow server 130, such as a distributed shared memory or another shared storage device, so that application state can be recovered by the failover version II SA of the application. Further details about different types of application failover (such as stateless and stateful failover), and the operations that may be performed by shadow CFD 120B during failover, are provided below in conjunction with the descriptions of FIG. 13 and FIG. 14.

After failover is completed, normal operations may be resumed, with the functions originally performed by primary server 110, server application 115 and primary CFD now being performed by shadow server 130, failover version 115A of the application, and shadow CFD 120B, respectively. In some embodiments, a new shadow server 130B including a new log 170B may be configured (e.g., as part of the failover of primary CFD 120A to shadow CFD 120B) to provide the logging and forwarding functions being performed by shadow server 130 prior to the failure. In one embodiment, if a recovery of primary server 110 is detected (e.g., if primary server reboots after a system crash), failover version 115A of application 115 and shadow CFD 120B may be configured to fail back to primary server 110 (i.e., to again provide application services and primary CFD services from primary server 110). Shadow server 130A, failover application version 115A and shadow CFD 120B may be configured for fail back in this manner even if no additional failure (i.e., no failure beyond the failure that lead to the failover) is detected in some embodiments, and may be configured for fail back only if a failure is detected at shadow server 130 and/or in a new shadow server 130B in other embodiments. A fail back technique may be implemented, for example, in an environment where primary server 110 is configured with hardware (e.g., faster processors, more memory, etc.) capable of higher overall performance than hardware at shadow server 130, so that transferring responsibilities for the server application back to the primary server after it recovers may result in a better quality of service than would be possible if the shadow server were used for the server application for an extended period.

Figure 5:
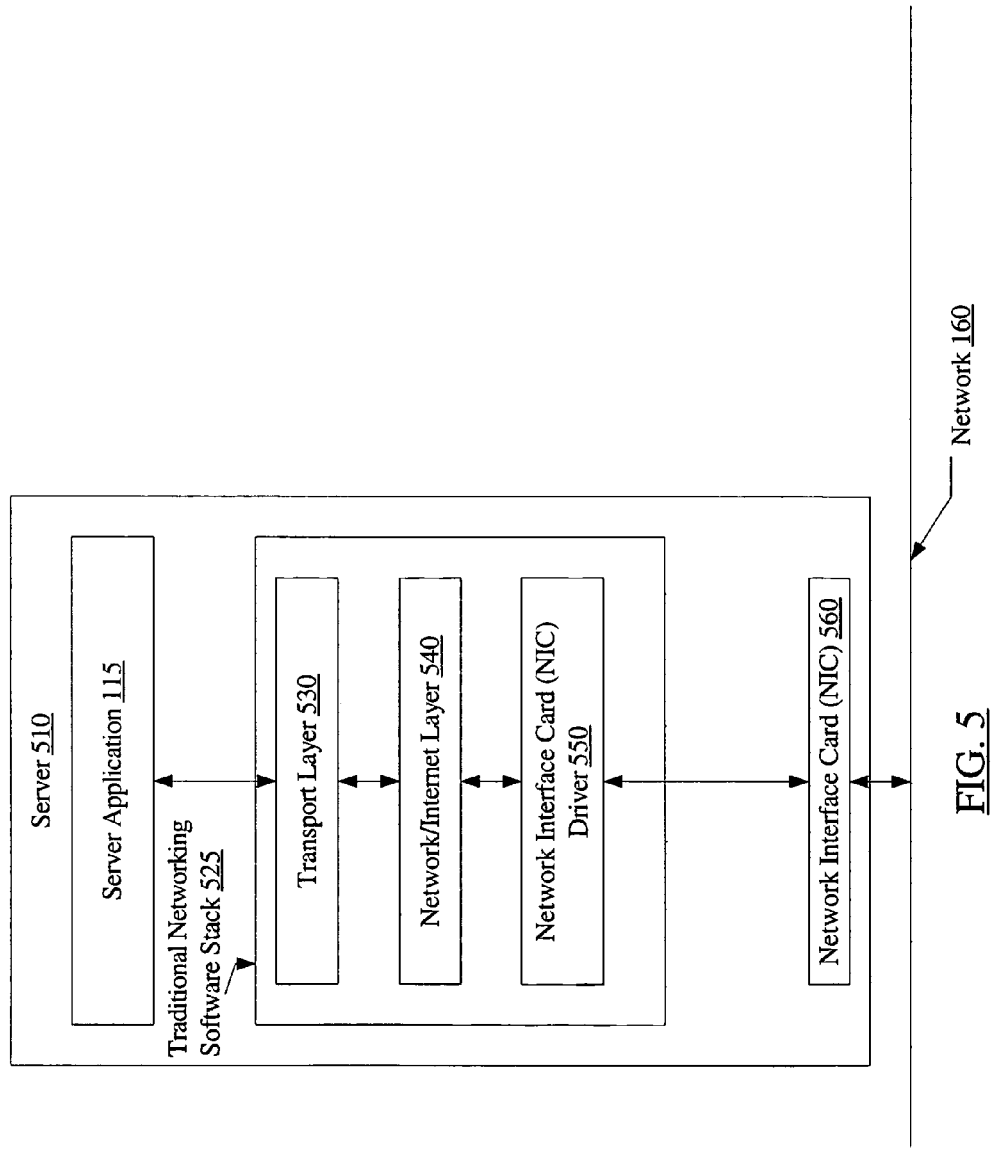
FIG. 5 is a block diagram illustrating a traditional networking software stack at a server, according to one embodiment.

It is noted that while the techniques illustrated in FIG. 3, FIG. 4 and FIG. 5 have been described in the context of a shadow server 130 interacting with a primary server 110 to save the state of network connections, similar techniques may be used in other embodiments at a client 140 or at a peer application server in an environment supporting peer-to-peer applications. Thus, for example, in one embodiment, a client CFD may be incorporated at client 140, and may be configured to redirect client-to-server messages to an additional shadow server (or the same shadow server used by primary server 110) for eventual forwarding to the primary server 110. Thus, the techniques of redirecting a message packet to a shadow server, and the shadow server forwarding the message packet to a destination, may be used for communication in either direction between a client and a primary server, or between peer applications.

Figure 6:
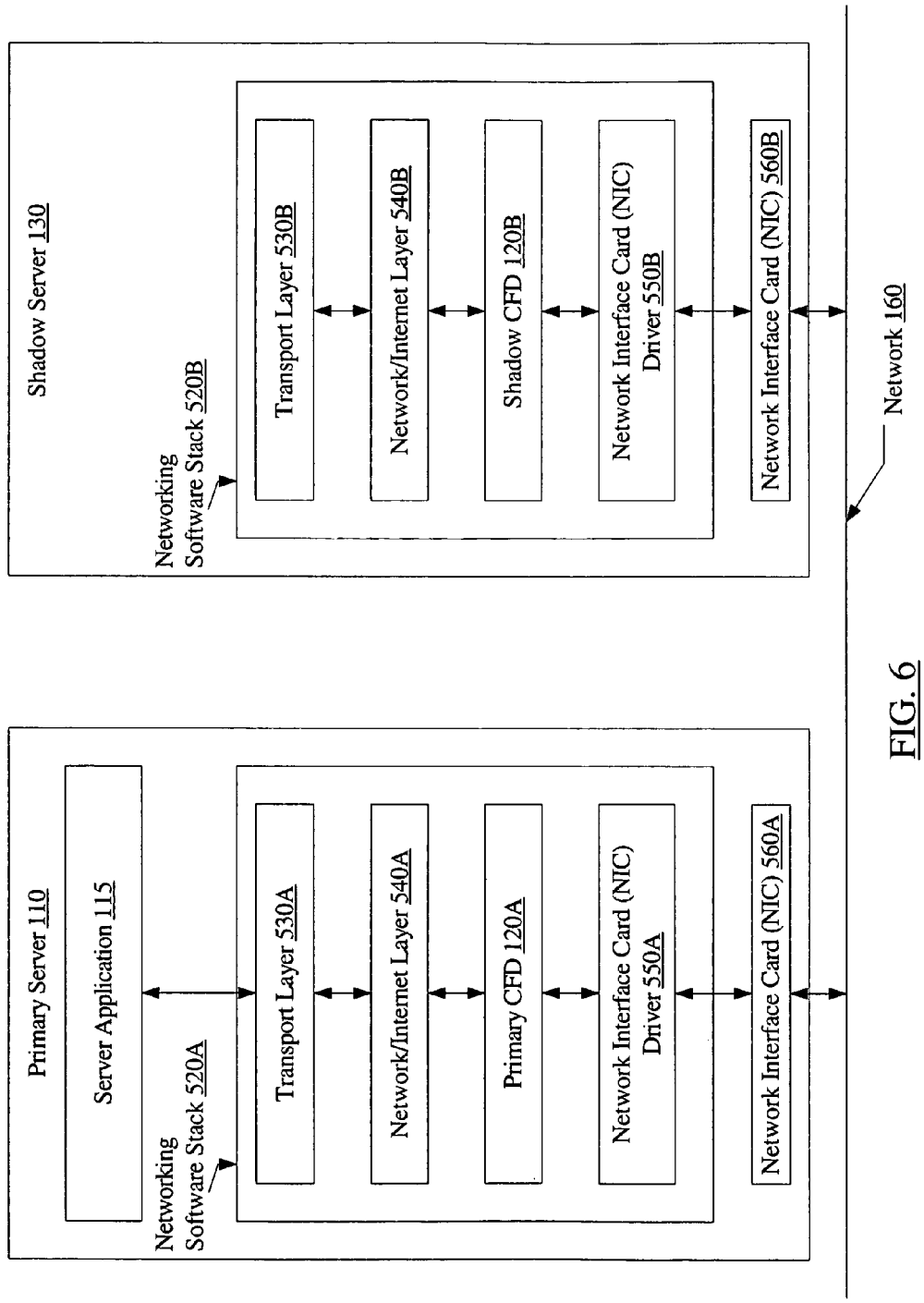
FIG. 6 is a block diagram illustrating an embodiment where a primary CFD is included within a networking software stack at a layer between a network/Internet layer and a NIC driver layer.
Figure 7:
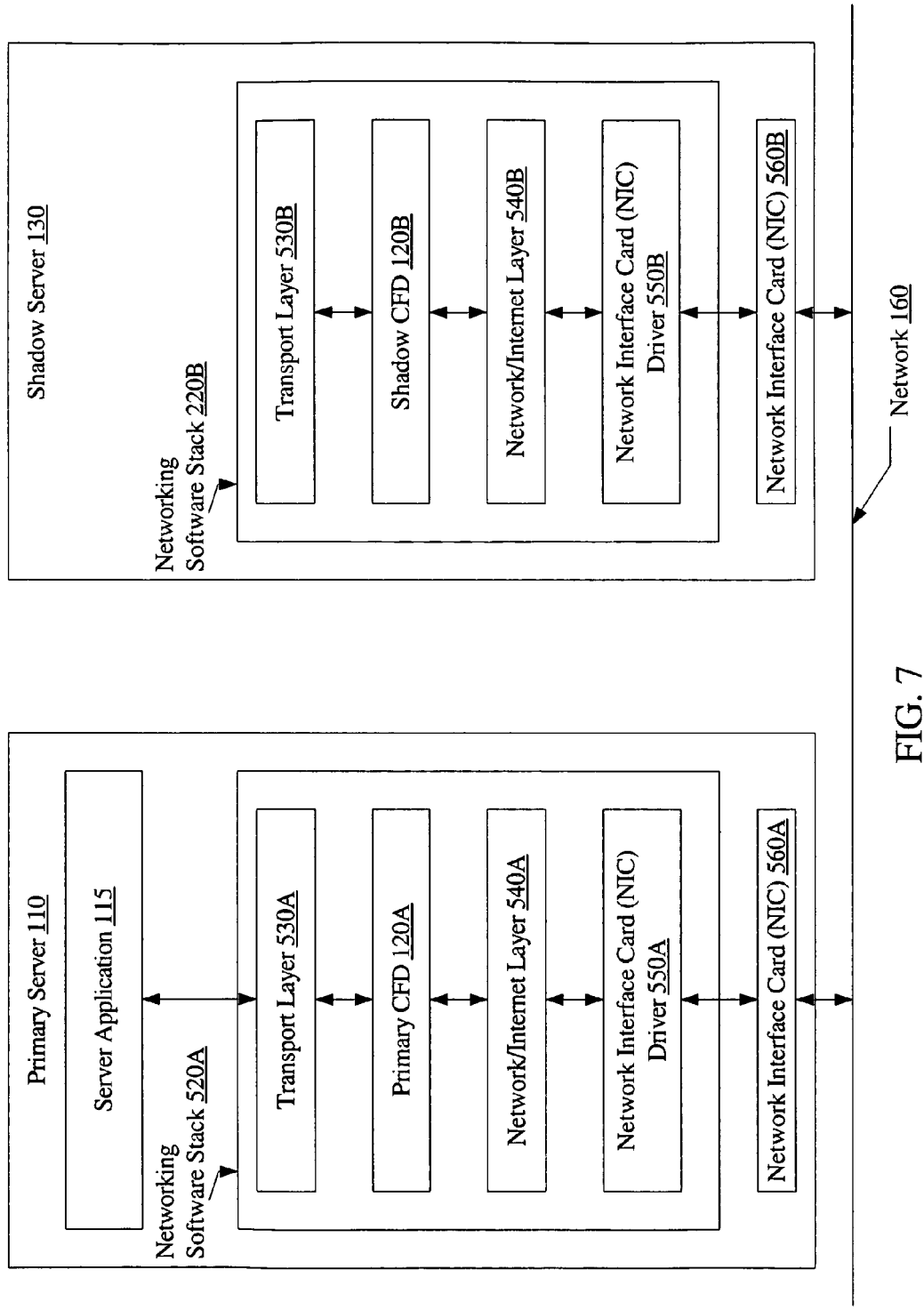
FIG. 7 is a block diagram illustrating an embodiment where the primary CFD is included within a networking software stack at a layer between a transport layer and a network/Internet layer.

As noted earlier, primary CFD 120A and shadow CFD 120B may each be implemented as a software layer or module configured to interact with an existing layered networking software stack within an operating system in use at primary server 110 and/or shadow server 130. FIG. 5 is a block diagram illustrating a traditional networking software stack 525 at a server 510 according to one embodiment. Server 510 may represent any server configured to support network communication, such as a primary server 110 or a shadow server 130 described earlier. It is noted that traditional networking stack 525 or an equivalent may also be implemented at client 140 in some embodiments. FIG. 6 and FIG. 7 are block diagrams illustrating examples of the manner in which a CFD may interact with various layers of a networking software stack at primary server 110 and shadow server 130 in different embodiments. As shown in FIG. 5, a traditional networking stack 525, such as one that implements various protocols of the TCP/IP suite, may include a transport layer 530, a "networking" or "Internet" layer 540, and a network interface card (NIC) driver layer 550. The networking stack 525 may typically form part of an operating system, such as various versions of Solaris™ from Sun Microsystems, Linux, and various versions of Windows™ from Microsoft Corporation. To conform to standards and to support interoperability in heterogeneous environments, different operating systems may include networking software stacks that provide similar functions at corresponding layers: e.g., a transport layer of a networking software stack in a Solaris™ operating system may provide similar functions to a transport layer in a Windows™ operating system.

The layers of the networking software stack 525 may provide different functions in accordance with the specific protocol or protocols being supported at each layer. For example, in a networking software stack 525 supporting TCP/IP, the transport layer 530 may implement TCP, and the network/Internet layer 540 may support IP. The transport layer 530 may implement reliable delivery of packets to applications such as server application 115, e.g., using positive acknowledgment with retransmission as described above. The transport layer 530 may also allow multiple server applications 115 within a given server 510 to communicate concurrently, e.g., it may demultiplex incoming traffic among the multiple server applications. In addition, the transport layer 530 may be configured to implement a state machine for each connection established between two endpoints (e.g., a sender and a recipient), to manage congestion control, timeouts, retransmissions, etc. A server application 115 may be configured to interact with the transport layer 530, for example using one or more system calls such as socket( ), bind( ), listen( ), accept( ), connect( ), read( ), write( ), close( ), and the like. At a sender, the transport layer 530 may add a header containing transport-level control information to a message packet body, including one or more of the following: source and destination information, a sequence number, an acknowledgment number, a window size indicating a maximum number of unacknowledged messages that may be outstanding, a checksum, an "urgent" pointer, various advanced options, etc. The header may be examined and used at a corresponding transport layer 530 at the recipient of the message packet. Various other functions may also be performed at transport layer 530.

The network or Internet layer 540 may be configured to handle communication from one machine or host to another. It may accept a request to send a packet from the transport layer 530, include the packet within a basic transfer unit that may be termed a datagram, generate a header for the datagram containing network/Internet layer control information, and use a routing algorithm to designate a next host to which the datagram is to be sent. The next host may be the destination of the datagram, or may be a router, a gateway, or some other intermediate device or host. The network/Internet layer 540 may be configured to pass the datagram for transmission to NIC driver layer 550. Incoming datagrams may also be handled (e.g., checked for validity, processed locally or forwarded) by the network/Internet layer 540. For datagrams addressed to the local host, the network/Internet layer may delete the datagram header and choose the appropriate transport protocol to which the remaining contents of the datagram should be forwarded. Various additional functions may also be supported at the network/Internet layer 540.

The NIC driver 550 may be responsible for accepting outgoing Internet layer datagrams and transmitting them over a specific NIC 560, such as an Ethernet card, using a data link layer protocol. NIC driver 550 may be configured to add its own header, for example containing a data link layer recipient address (such as a Media Access Control or MAC address in the case of Ethernet) to the datagram. Several NIC drivers may be supported within NIC driver layer 550 at a given server 510 in some embodiments, and network/Internet layer 540 may be configured to select an appropriate NIC driver from the available NIC drivers in such embodiments. A NIC driver layer 550 may also be responsible for receiving incoming datagrams received at a NIC 560 in accordance with a data link layer protocol, and passing them on to a next higher-level networking software layer such as the network/Internet layer 540.

FIG. 6 is a block diagram illustrating an embodiment where the primary connection failover driver (CFD) 120A is included within a networking software stack 520A at a layer between a network/Internet layer 540A and a NIC driver layer 550A. Similarly, in the embodiment depicted in FIG. 6, the shadow CFD 120B is included within a networking software stack 520B at a layer between a network/Internet layer 540B and a NIC driver layer 550B at shadow server 130. FIG. 7 is a block diagram illustrating another embodiment, where the primary CFD 120A is included within a networking software stack 520A at a layer between a transport layer 530A and a network/Internet layer 540A, and the shadow CFD 120A is included within a networking software stack 520B between a transport layer 530B and a network/Internet layer 540B. It is noted that in the embodiments depicted in FIG. 6 and FIG. 7, a CFD 120 (i.e., CFD 120A or CFD 120B) is incorporated at a layer of the networking stack that is below a transport layer 530 (i.e., CFD 530A or CFD 530B). The specific layer at which a CFD 120 is included within a networking software stack 520 (i.e., stack 520A or 520B) may affect the specific headers that may be modified or inspected by the CFD 120 in order to implement the redirection/forwarding operations described earlier. For example, in the embodiment depicted in FIG. 6, CFD 120A may be configured to modify information contained within a data link layer header (such as an Ethernet MAC address) in order to redirect an outgoing message packet to shadow server 130, and to leave network/Internet layer and transport layer headers unmodified. In the embodiment depicted in FIG. 7, CFD 120A may be configured to modify information contained within a network/Internet layer header, and to leave the transport layer header unmodified.

In both the embodiments depicted in FIG. 6 and FIG. 7, the CFDs 120 may be activated dynamically, without requiring a modification, recompilation or re-linking of existing code in remaining layers of the corresponding network software stacks 520. For example, in response to a configuration command, the operating system in use at primary server 110 may be configurable to dynamically branch to code within the CFD 120A when any of a number of functions is invoked within a neighboring layer of the networking software stack. In some embodiments, the operating system may also allow dynamic reconfiguration, deactivation and/or disablement of the CFDs 120. The enablement and/or disablement of a CFD 120 may thus not require modification of the functionality provided by other layers of the corresponding networking software stack 520.

Figure 8:
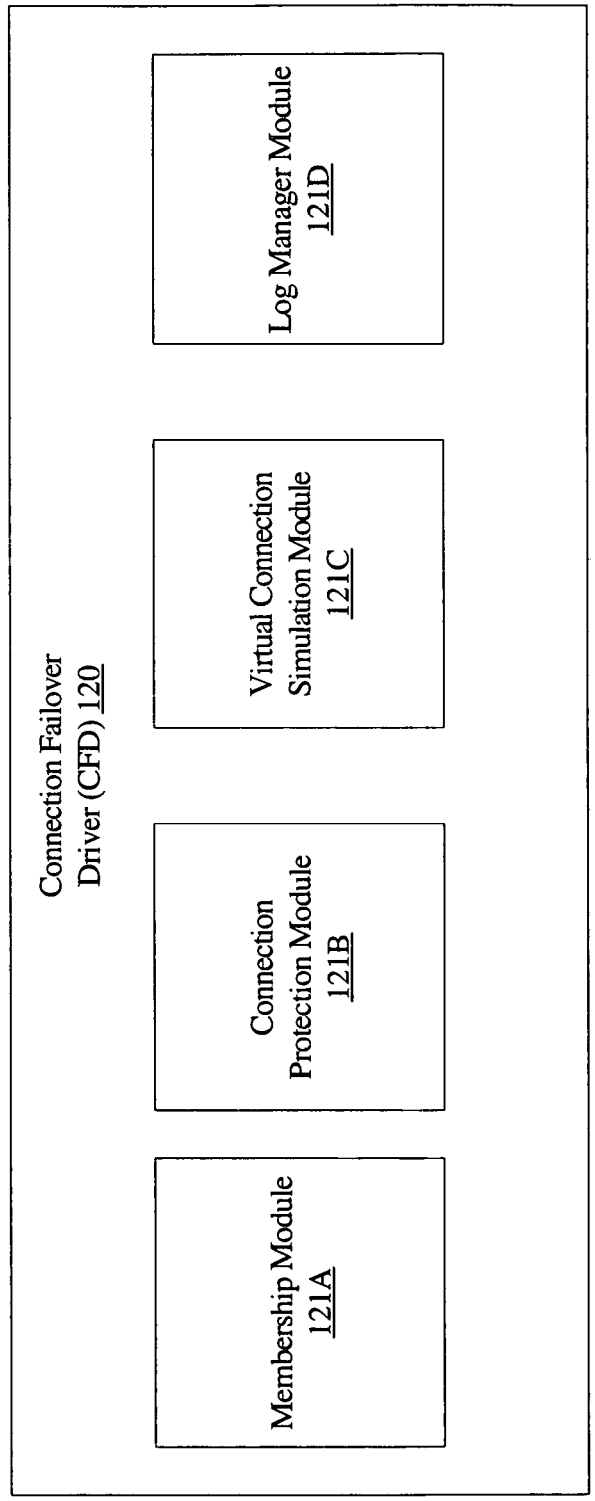
FIG. 8 is a block diagram illustrating various constituent modules that may be included within a CFD, according to one embodiment.

FIG. 8 is a block diagram illustrating various constituent modules that may be included within a connection failover driver 120 according to one embodiment. It is noted that while a given CFD 120 may be configured to provide different functions depending, for example, on whether the given CFD is executing at a primary server 110 or at a shadow server 130 at a given time, in general the same modules may be included within each CFD 120. Different functions supported by the constituent modules of the CFD may be activated as the role of the CFD changes, e.g., from being a shadow CFD 120B to being a primary CFD 120A after a failover.

As shown in FIG. 8, a CFD 120 may include a membership module 121A, a connection protection module 121B, a virtual connection simulation module 121C, and a log manager module 121D in the depicted embodiment. Membership module 121A may be configured to implement heartbeat message generation and monitoring on a collection of servers such as primary server 110, shadow server 130, as well as additional servers that may be configured as future or potential candidates for failover. In one embodiment, a membership module 121A at each participating server may be configured to generate heartbeat messages targeted at each other participating servers, and to keep track of heartbeat messages received from each of the other participating servers. If a heartbeat message or a specified number of successive heartbeat messages is not received from a given server, the membership module 121A may be configured to (either alone or in cooperation with other membership modules at other servers) infer that the given server has failed, and to initiate desired failover functions in response to the detection. The membership module 121A may support the joining of new servers wishing to cooperate with the existing set of servers in connection and/or application failover, the departure of a server from the group, and other similar group membership functions. In other embodiments, instead of or in addition to managing heartbeat messages as described above, a membership module 121A may be configured to cooperate with another software module such as a cluster manager to track the availability or failure of other servers that may be configured to participate in connection and/or application failover.

Connection protection module 121B may be configured to perform a number of functions to maintain a previously established connection (e.g., to prevent a previously established network connection from being closed) upon the occurrence of a failure. For example, in one embodiment, a connection protection module 121B in shadow CFD 120B may be configured to take over an IP address associated with the primary server 110 in the event of a failure at primary server 110. That is, connection protection module 121B may be configured to start accepting message packets with a destination IP address that was previously the IP address of the primary server 110, and to start transmitting message packets that include a source IP address that was previously the IP address of the primary server 110. In some embodiments, connection protection module 121B may be configured to utilize existing functionality provided, for example, by a cluster manager or by a "Virtual IP" module or modules, to take over the IP address.

Connection protection module 121B may also be responsible for sending control information to client 140 for a connection that is to be kept open after a failure, for example by sending one or more acknowledgments packets with appropriate sequence numbers, by adjusting a TCP window size, etc., in one embodiment. For example, during a period when a failover version 115B of the server application is performing recovery operations (e.g., re-issuing messages sent earlier to the client that have not yet been acknowledged), connection protection module 121B may be configured to send client 140 control information indication that the networking software stack 525 at the client 140 should temporarily stop sending new messages on the connection, thus giving the failover application time to complete recovery operations without having to manage new client requests. Connection protection module 121B may also be configured to modify or adjust sequence numbers and/or acknowledgment numbers within packets transmitted from the shadow server 130 (as it takes over the function of the primary server 110 after a failure) to client 140 in some embodiments, in order to match the values for the sequence numbers and/or acknowledgment numbers that may be expected by the client 140. Connection protection module 121B may be configured to access entries saved in log 170 in order to perform one or more of its functions.

Virtual connection simulation module 121C may be configured to perform one or more authentication or security related functions, and/or to simulate the behavior of client 140 during a reestablishment of connections between a failover version 115B of the server application and the client application 145. For example, in one embodiment, when a failover version 115B is started up or initialized and attempts to communicate with client application 145, virtual connection simulation module 121C may be configured to authenticate the failover version 115B of the server application, to ensure that an unauthorized entity (such as software introduced at shadow server 130 by a virus or as a result of an intrusion) does not take over from the failed server application 115. For each connection to be recovered or reestablished, in one embodiment, virtual connection simulation module 121C may simulate the behavior expected of the client application 145 by the failover version 115B of the server during a connection establishment. For example, if a TCP connection was previously established via an "active open" at the client in one implementation, virtual connection simulation module 121C may be configured to resend the same packets to the failover version 115B of the application during connection reestablishment that were earlier sent by the client 140 to the server application 115 during the "active open". Virtual connection simulation module 121C may be configured to obtain the packets needed to simulate client behavior from log 170 in some embodiments.

Log manager module 121D may be configured to save redirected and/or copied message and acknowledgment packets within log 170 in some embodiments. In addition, other log-related functions, such as deleting entries from log 170 that may no longer be needed, saving log entries from volatile memory to persistent storage, replaying log entries during failover and connection reestablishment, and/or providing log access to virtual connection simulation module 121C and connection protection module 121B, may also be supported by log manager 121D in various embodiments. Further details about aspects of the operation of a log manager module 121D in one embodiment are provided below in conjunction with the description of FIG. 12. It is noted that not all the modules 121A-121D shown in FIG. 8 may be implemented in some embodiments. In addition, some or all of the functions described for modules 121A-121D above may be performed by other modules (including modules not shown in FIG. 8), or may be omitted in some embodiments. Additional functions, not associated specifically with any of the modules 121A-121D in the foregoing description, may also be performed by a CFD 120 in some embodiments. As noted earlier, the specific functions being performed by a given CFD 120 may vary from time to time in some embodiments, and the functions performed by a primary CFD 120A at a given point of time may differ from the functions being performed by a shadow CFD 120B.

Figure 9:
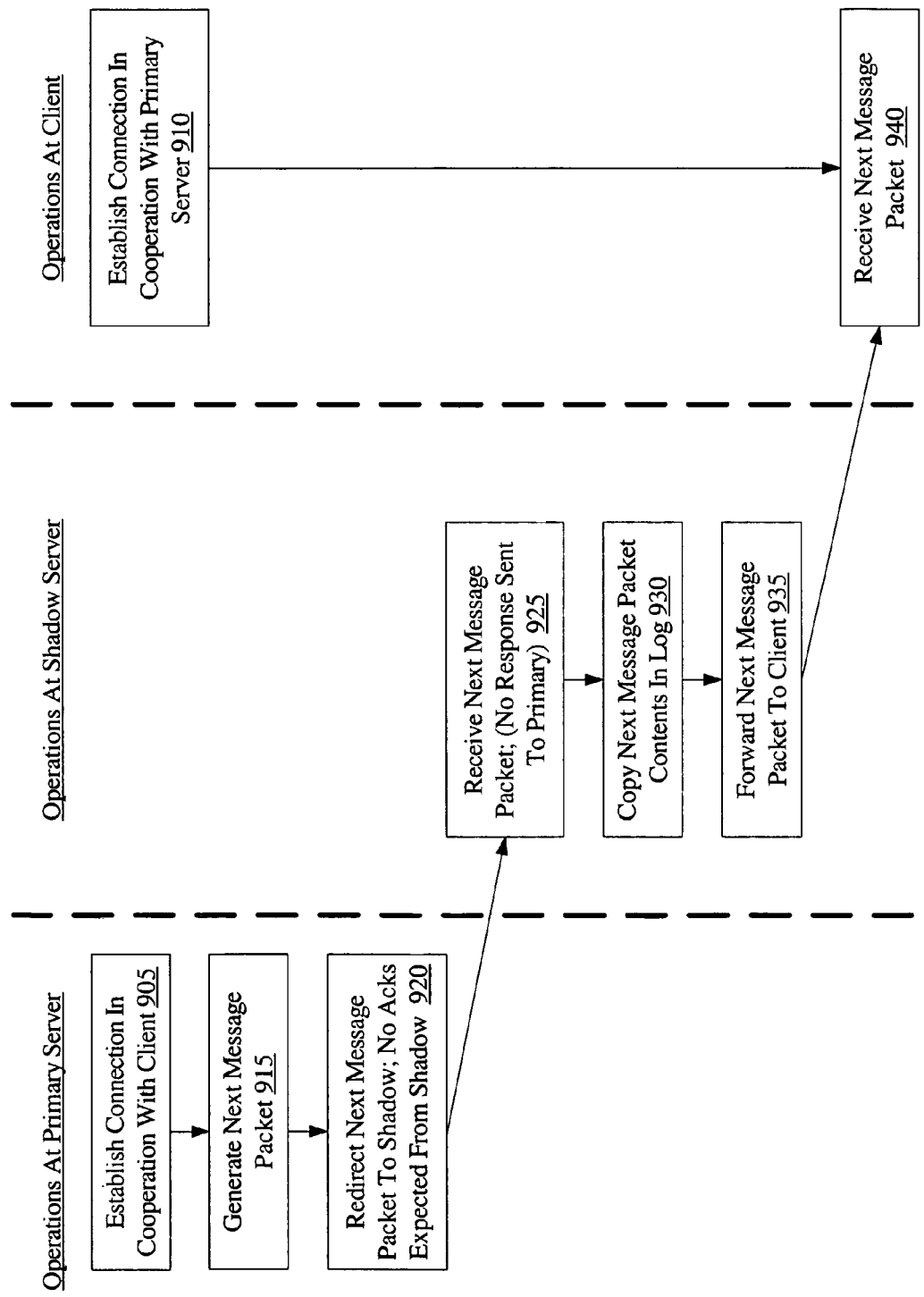
FIG. 9 is a flow diagram illustrating aspects of the operation of a primary server, a shadow server and a client during transmission of a message packet directed at the client from the primary server, according to one embodiment.

FIG. 9 is a flow diagram illustrating aspects of the operation of primary server 110, shadow server 130 and client 140 during transmission of a message packet directed at client 140 from the primary server 110, according to one embodiment. As shown in blocks 905 and 910, primary server 110 and client 140 may be configured to cooperate to establish a network connection, for example via a reliable network protocol such as TCP. The networking software stack at primary server may generate a next message packet for transmission (block 915) to client 140 over the connection. Primary CFD 120A may be configured to intercept the next message packet, and to redirect it to the shadow server 130 (block 920) as described earlier, without expecting any acknowledgment from the shadow server 130. On receiving the redirected message packet (block 925), shadow server 130 may not send any acknowledgment to the primary server 110. Shadow CFD 120B may be configured to copy the contents of the next message packet into the log 170 (block 930), and to forward the next message packet to client 140 (block 940) as described earlier. Client 140 may receive the forwarded message packet (block 945), which may appear to the client to have been sent directly by the primary server.

Figure 10:
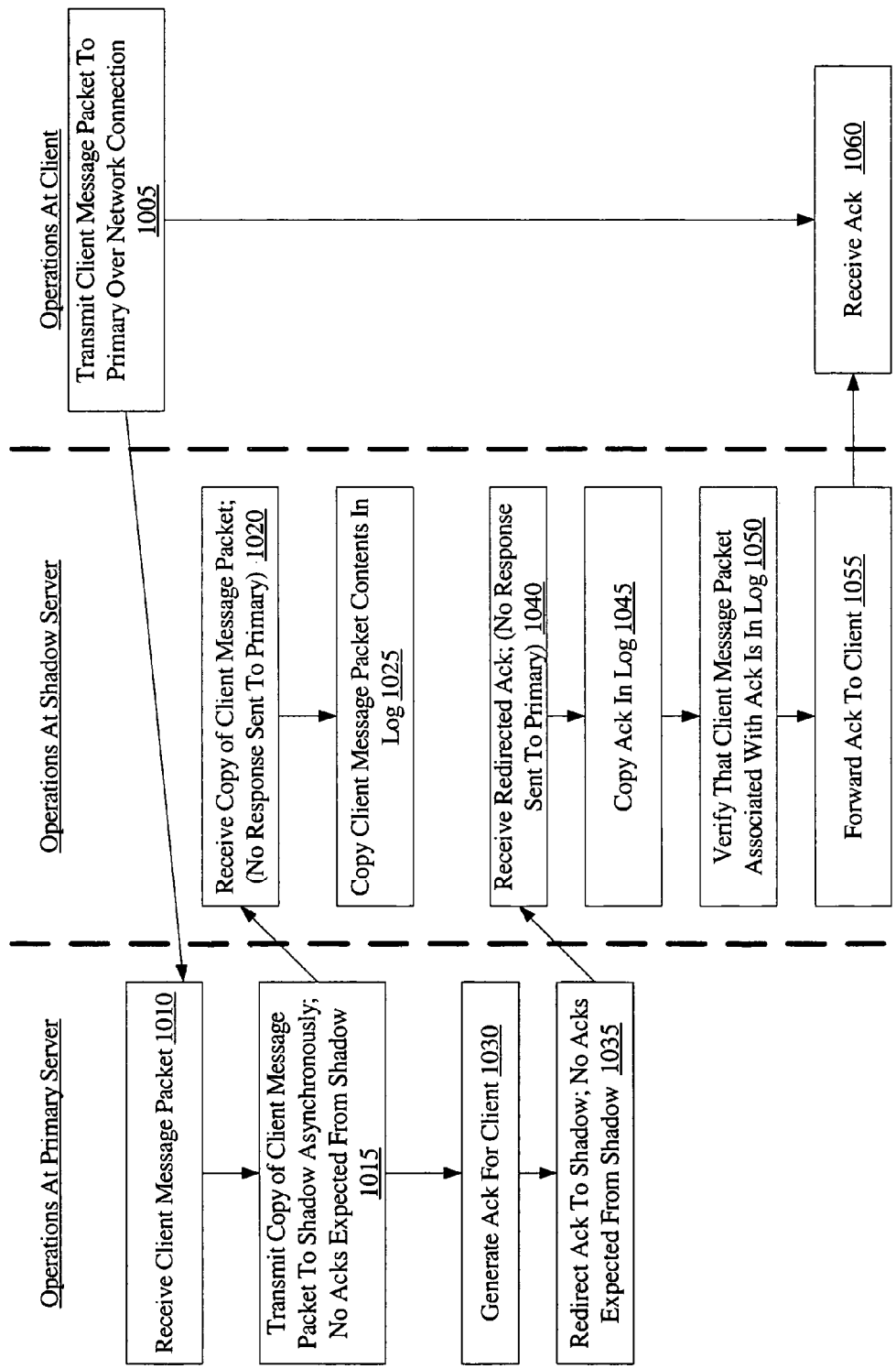
FIG. 10 is a flow diagram illustrating aspects of the operation of a primary server, a shadow server and a client, related to the transmission and acknowledgment of a client message packet directed at the primary server from the client, according to one embodiment.

FIG. 10 is a flow diagram illustrating aspects of the operation of primary server 110, shadow server 130 and client 140 related to the transmission and acknowledgment of a client message packet directed at primary server 110 from client 140, according to one embodiment. Client 140 may be configured to transmit the client message packet to primary server 110 in accordance with the network protocol being used for the connection previously established between client 140 and primary server 110, as shown in block 1005 of FIG. 10, e.g., using an unmodified traditional networking software stack 525 at client 140 that does not include a CFD. That is, unlike packets directed at client 140 from primary server 110, packets directed from client 140 to primary server 110 may not be subject to redirection and/or forwarding by a CFD 120. On receiving the client message packet (block 1010), primary CFD 120A at primary server 110 may be configured to transmit a copy of the client message packet to shadow server 130 (block 1015), and to deliver the contents of the client message packet to one or more remaining layers of the networking software stack in use at the primary server 110 and/or to server application 115. The transmission of the copy of the client message packet may be performed asynchronously in some embodiments, e.g. in order to reduce the performance impact on the delivery of the client message packet to server application 115. No acknowledgment may be expected at the primary server 110 for the copy of the client message packet sent to the shadow server 130. Upon receiving the copy of the client message packet (block 1020), shadow CFD 120B at shadow server 130 may be configured to copy the contents of the client message packet in the log (block 1025) without sending any response or acknowledgment to the primary server 110.

In response to the reception of the client message packet, the networking software stack 520A at the primary server 110 may be configured to prepare an acknowledgment for the client message packet (e.g., at a transport layer 530A such as a TCP layer of the networking software stack) (block 1030). The acknowledgment may be prepared as part of a message packet, or in a separate acknowledgment packet. Primary CFD 120A may be configured to redirect the packet containing the acknowledgment to the shadow server 130 (block 1035), again expecting no acknowledgments from the shadow server 130 in response to the redirection. Upon receiving the redirected packet with the acknowledgment (block 1040), shadow CFD 120B may be configured to save the contents of the redirected packet, including the acknowledgment, in log 170 (block 1045) without sending a response to the primary server 110. Shadow CFD 120B may be configured to verify that the client message packet corresponding to the acknowledgment (i.e., the client message packet for which the acknowledgment was generated) has been received at shadow server 130 and/or saved in log 170 (block 1050), prior to forwarding the packet containing the acknowledgment to client 140 (block 1055). In one embodiment, where for example a sequence number is associated with each packet and used for acknowledgments, shadow CFD 120B may be configured to verify that a sequence number identified in the acknowledgment matches a sequence number for a client message packet saved in the log. Client 140 may receive the packet containing the acknowledgment (block 1060), which may appear to the client to have been sent directly from primary server 110.

Figure 11:
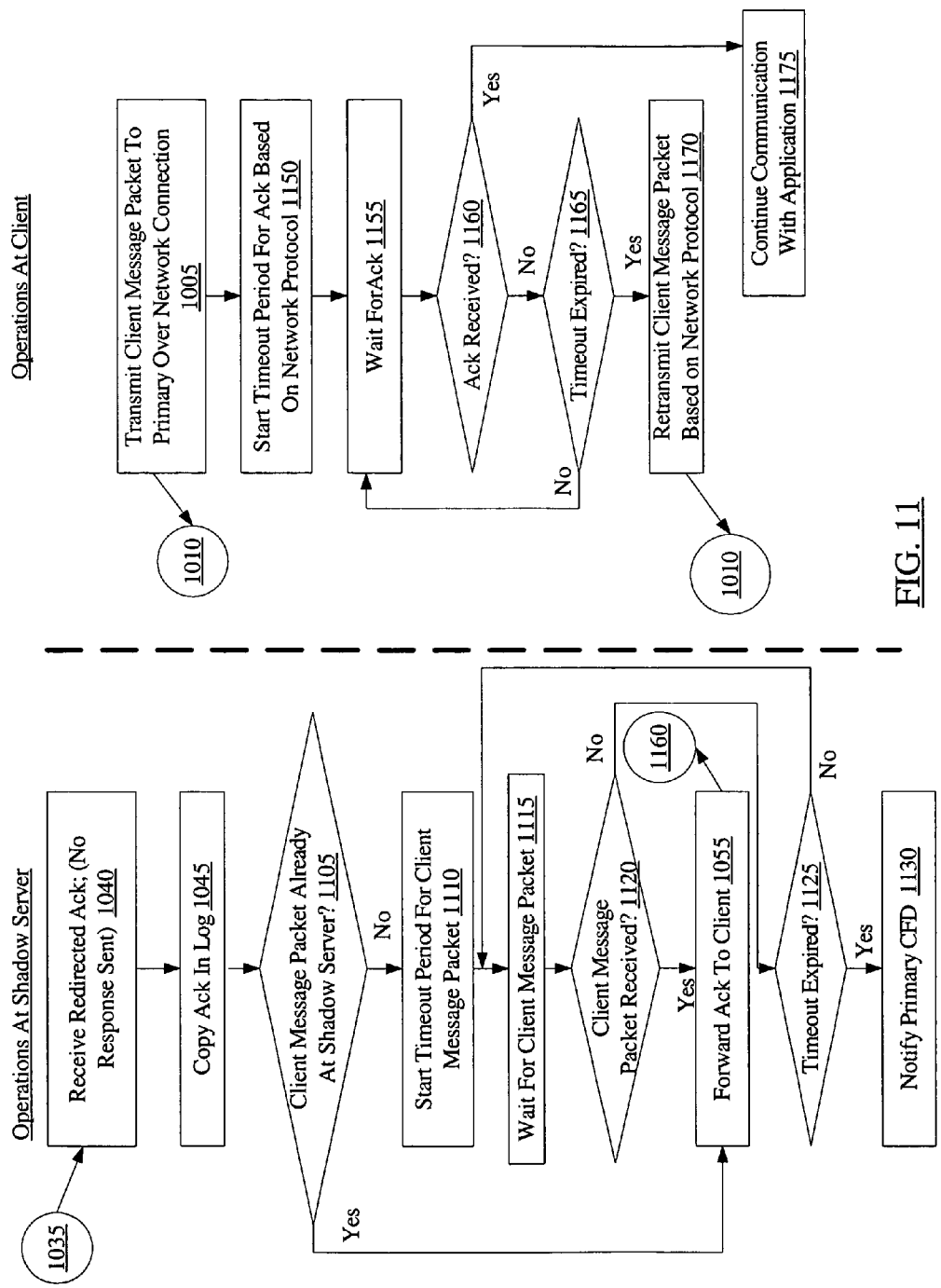
FIG. 11 is a flow diagram illustrating further aspects of the operation of a shadow server and a client during transmission and acknowledgment of a client message packet directed at a primary server from the client, according to one embodiment.

FIG. 11 is a flow diagram illustrating further aspects of the operation of shadow server 130 and client 140 during transmission and acknowledgment of a client message packet directed at primary server 140 from client 140, according to one embodiment. As described above in conjunction with the description of block 1005 of FIG. 10, client 140 may be configured to transmit a client message packet to primary server 110 over the network connection established between the client and the primary server. For clarity, block 1005 of FIG. 10 is repeated in FIG. 11, and operations performed at the primary server 110 in response to the reception of the client message packet, such as operations illustrated in block 1010 of FIG. 10, are symbolized in FIG. 11 by a circle labeled "1010". After sending the client message packet, a layer of networking software stack at client 140 (such as a transport layer similar to transport layer 530) may be configured to start a timeout period, based on parameters of the network protocol in use for the network connection, for an acknowledgment corresponding to the client message packet (block 1150).

After the client message packet is received at the primary server, an acknowledgment may be generated for the client message packet and redirected to the shadow server 130, as described above and as indicated by the circle labeled 1035 (representing the operations corresponding to block 1035 of FIG. 10) in FIG. 11. The shadow CFD 120B may be configured to receive a packet containing the acknowledgment and save the contents of the packet in the log 170 (blocks 1040 and 1045 of FIG. 11, repeated for clarity from FIG. 10). As noted earlier, shadow CFD 120B may be configured to check whether the client message packet has already been received and/or saved in log 170, prior to forwarding the redirected packet containing the acknowledgment (decision block 1105). If the client message packet has been received and/or saved in log 170, shadow CFD 120B may be configured to forward the acknowledgment to client 140 (block 1055 of FIG. 11, repeated from FIG. 10). If the client message packet has not been received or is not found in the log 170, shadow CFD 120B may be configured to start a configurable timeout period during which it expects the copy of the client message packet to be received from primary server 110A (block 1110). Shadow CFD 120B may then wait for the copy of the client message packet (block 1115). If the copy of the client message packet is received before the timeout expires (as detected in decision block 1120), the acknowledgment may be forwarded to the client. Otherwise, if the timeout expires before the copy of the client message packet is received (as detected in decision block 1125), shadow CFD 120B may be configured to notify primary CFD 120A (block 1130) in one embodiment. In some embodiments, a reliable connection (e.g., a TCP connection) may be established between shadow CFD 120B and primary CFD 120A for such notifications and/or for transmission of other control information. As noted above, in some embodiments shadow CFD 120B may be configured to notify primary CFD 120A of a detection of a missing copy of a client message packet (e.g., when a redirected acknowledgment is received for which the associated copy of the client message packet has not been received), and/or to notify primary CFD 120A of a detection of a missing acknowledgment (e.g., when a copy of a client message packet is received, but no corresponding redirected acknowledgment is received within a specified time interval).

Having started a timeout period waiting for an acknowledgment for the client message packet (block 1150), client 140 may be configured to wait for the acknowledgment (block 1155). If the acknowledgment is received before the timeout expires (as detected in decision block 1160), client 140 may be configured to continue communication with the server application 115 (block 1175), for example by generating a new client request or responding to a message received from the primary server 110. If the client's timeout expires before the acknowledgment is received (as detected in decision block 1165), client 140 may retransmit the client message packet in accordance with the network protocol in use for the connection to primary server 110 (block 1170). Such a retransmission may lead to further operations at the primary server 110, similar to those described earlier in response to the original transmission of the client message packet to the primary server 110.

The expiration of the client timeout while waiting for an acknowledgment, as illustrated in FIG. 11 for one embodiment, may be caused by one or more packets (such as packets containing a copy of the client message packet, or packets containing acknowledgments) being dropped or delayed during transmission over an unreliable network protocol from primary CFD 110A to shadow CFD 110B. As noted earlier, such data loss and/or delay may typically be rare. However, if such a data loss or delay does occur, the retransmission of the client message packet in accordance with the network protocol used for the client-to-primary server connection may resolve the problem with minimal overhead. The timeout used at shadow server 130 while waiting for a copy of the client message packet (e.g., in operations corresponding to block 1110) may be set at a larger value than the timeout value that may be in use at the client in some embodiments, so that retransmissions from the client may allow the shadow server to avoid having to notify the primary server of missing client message packets.

Figure 12:
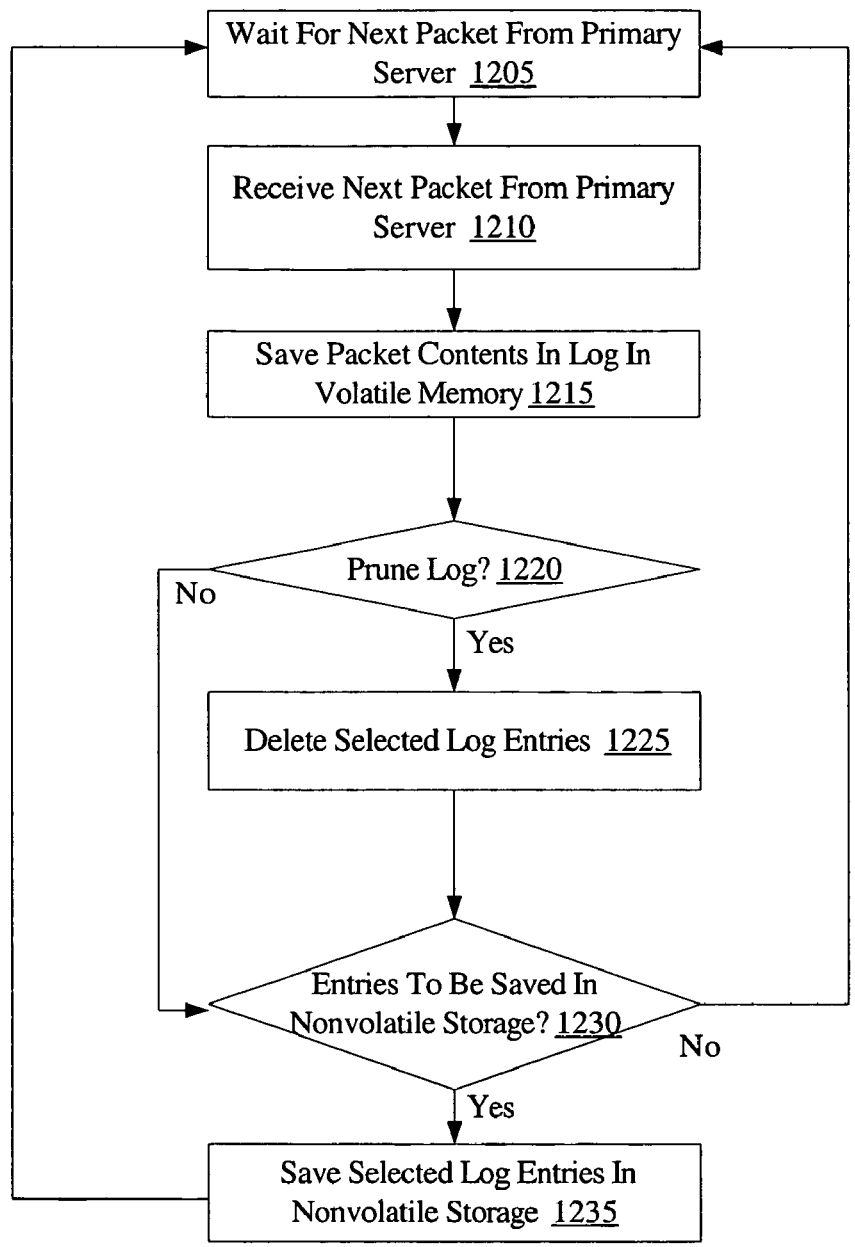
FIG. 12 is a block diagram illustrating aspects of the operation of a log manager module of a shadow CFD according to one embodiment.

FIG. 12 is a block diagram illustrating aspects of the operation of a log manager module 121D of a shadow CFD 120B according to one embodiment. In the depicted embodiment, at least a portion of log 170 may be maintained within a volatile memory. Log manager module 121D may be configured to wait for the next packet from the primary server 110 (block 1205), such as a redirected message packet, a redirected acknowledgement packet, or a copy of a client message packet. On receiving the next message packet (block 1210), log manager module 121D may be configured to save contents of the packet in a portion of the log maintained in volatile memory (block 1215). In some embodiments, for packets directed at client 140, after the contents of the packet have been saved in volatile memory, the packet may be forwarded to the client, and one or more of the remaining operations shown in FIG. 12 may be performed asynchronously or in the background. In one embodiment, for example, log manager module 121D may be configured to periodically prune the log 170, i.e., to remove entries that may no longer be useful, such as entries for connections that have been closed. If such log pruning is to be performed (as detected in decision block 1220), log manager module 121D may be configured to select any entries appropriate for removal, and delete such entries from the log if any are selected (block 1225).

In addition, in some embodiments, log manager module 121D may also be configured to save a subset or all of the entries of log 170 that are maintained in volatile memory to persistent storage (such as disk or non-volatile RAM (NVRAM)). If any entries are to be saved to persistent storage (as detected in decision block 1230), log manager module 121D may be configured to save selected log entries in non-volatile or persistent storage (block 1235), and to again wait for the next packet from the primary server (block 1205). As noted above, entries of log 170 may be saved to non-volatile storage asynchronously in one embodiment. In some embodiments, all entries in the volatile memory portion of log 170 that have not been pruned may be saved to persistent storage, while in other embodiments, a criterion such as connection age (i.e., the duration for which a connection has been open), the number of entries currently in the volatile memory, or another criterion may be used to select a subset of entries for saving to nonvolatile storage. It is noted that the pruning operation described above may be performed on both the volatile memory and nonvolatile storage portions of a log 170 in some embodiments, and on either the volatile portion or the persistent portion in other embodiments. Pruning may be performed after saving log entries to persistent storage, or in parallel with storing entries to persistent storage in some embodiments, instead of in the sequence shown in FIG. 12. In some embodiments, either the pruning operations, the saving of log entries to persistent storage, or both the pruning and the saving operations, may be omitted. In one implementation, all entries of the log 170 may be maintained in non-volatile storage, such as NVRAM, while in another implementation, all log entries may be maintained only within volatile memory.

Figure 13:
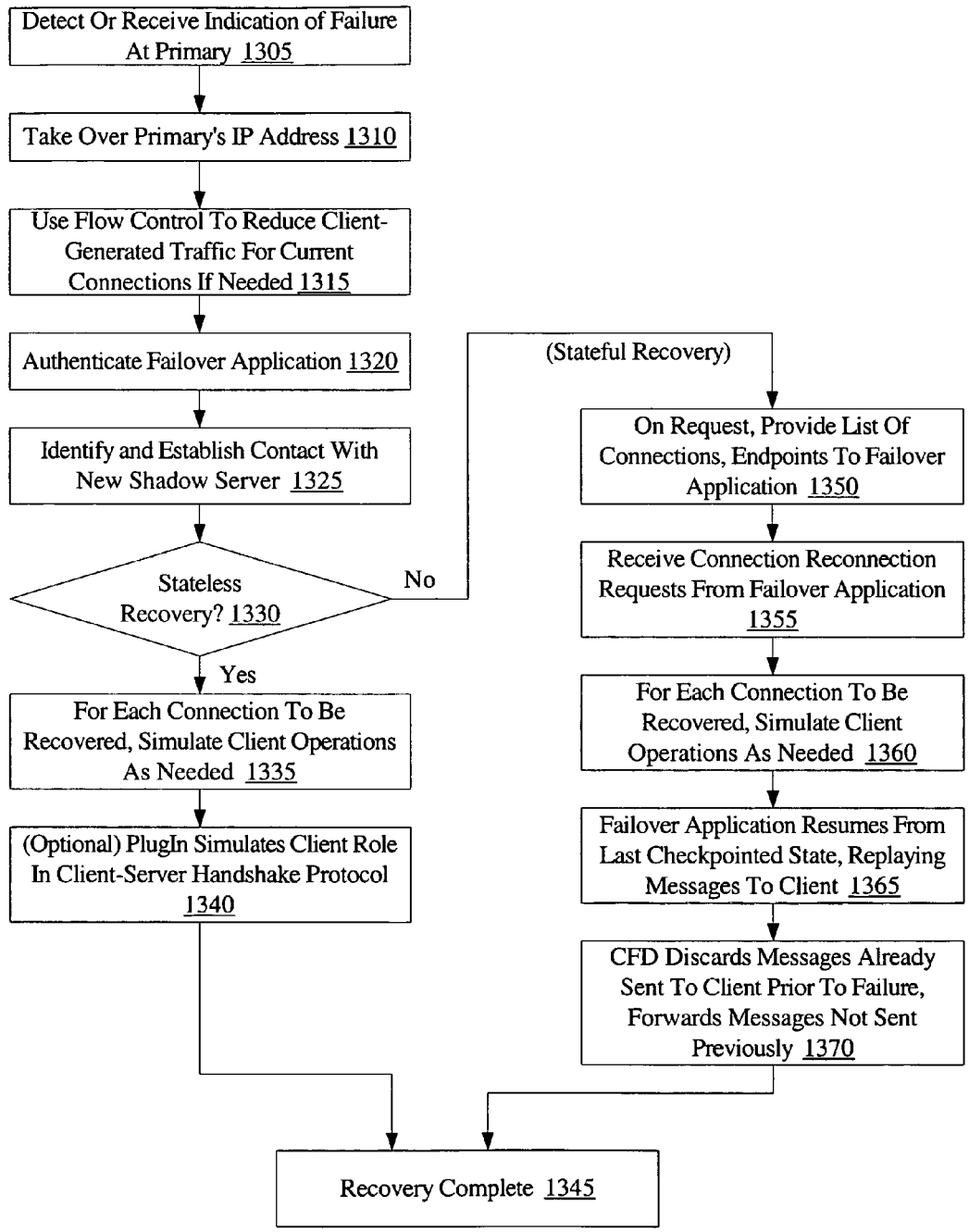
FIG. 13 is a flow diagram illustrating aspects of the operation of a shadow server in response to a failure, according to one embodiment.

FIG. 13 is a flow diagram illustrating aspects of the operation of a shadow server 130 in response to a failure, according to one embodiment. As described earlier, a failover version 115B of the server application 115 may be started at shadow server 130 in the event of a failure at primary server 110. With the help of CFD 120B (which used to be a shadow CFD, but may be configured to take over the functionality of a primary CFD in response to the failure), the failover version 115B of the application may be configured to re-establish connectivity to client application 145 and to resume providing server application functionality, without closing one or more connections that may have been opened for communication with the client application 145. As described below, a given server application 115 may be configured for stateless failover or for stateful failover, and the operations performed by the CFD 120B may differ for the two kinds of failover.

Any desired failure detection mechanism, such as a heartbeat mechanism, may be used at the shadow server 130 to detect or infer the failure of the primary (block 1305) in the embodiment depicted in FIG. 13. CFD 120B may be configured to take over an IP address previously associated with the primary server 110 and/or specifically associated with server application 115 (block 1310). For one or more connections that were open at the time of the failure, CFD 120B may be configured to send flow control information to the client, e.g., to simulate the presence of a connected server application 115 and/or to reduce or eliminate client-generated traffic while the failover application is brought up and recovery operations performed at the shadow server (block 1315). CFD 120B may be configured to derive the flow control information (as well as other control information such as appropriate sequence numbers etc.) using connection state information from one or more entries of log 170. By maintaining or keeping alive connections that were open at the time of the failure, and/or by sending control information to the client 140 as needed, CFD 120B may be configured to prevent the client from detecting that a failure occurred. CFD 120B may also be configured to authenticate the server application, e.g., by checking one or more security credentials provided by the failover version 115B of the server application (block 1320). In some embodiments, CFD 120B may also be configured to select an additional server, such as server 130B of FIG. 4, to serve as a new shadow server (block 1325), and to establish contact with the selected additional server, e.g., in order to initialize the operations of a CFD 120 at the additional server.

Figure 14:
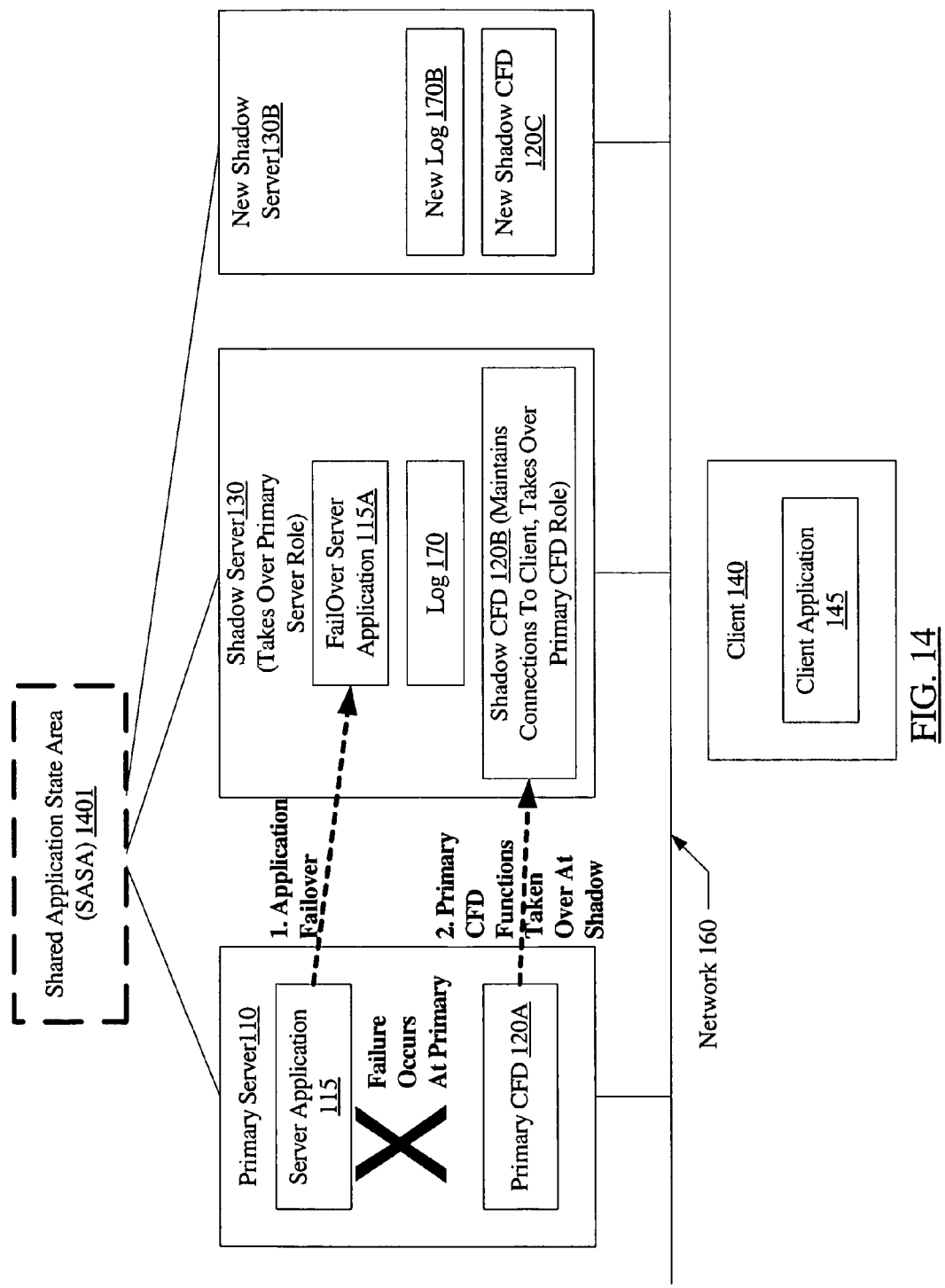
FIG. 14 is a block diagram illustrating an embodiment where each server of a plurality of servers is configured to have access to a shared application state area.

Some server applications 115 may be configured for stateless recovery. For example, a failover version of a network monitoring server application may only need re-establishment of existing network connections that were open at the time a failure at a primary server 110 occurred, and may not need to repeat message transmissions or recover additional application state. As described below and illustrated in FIG. 13, CFD 120B may be configured to automatically reestablish connections for a stateless recovery using connection state information obtained from log 170, without explicit requests from the application identifying specific connections to be reestablished. Other server applications, which may be termed stateful applications, may be configured to maintain application state transactionally, for example in a shared storage area called a shared application state area (SASA) as illustrated in FIG. 14. FIG. 14 is a block diagram illustrating an embodiment where each server of a plurality of servers (servers 110, 130, and 130B) is configured to have access to a SASA 1401, in which application state information for a server application 115 may be saved. Shared application state area 1401 may be implemented using any desired storage technology, such as a distributed shared memory (DSM), NVRAM, or using any of a number of disk-based storage devices, such as SAN-connected storage, SCSI-connected disks or disk arrays, etc. As a stateful application performs services in response to client requests, it may be configured to save or checkpoint application state in one or more entries in the shared application state area 1401. Entries saved in SASA 1401 may indicate committed or completed operations. Each entry in SASA 1401 may correspond to one or more message packets transmissions and/or acknowledgments that may have been logged in log 170. In order to reach a consistent application state after a failure at the primary server 110, a failover version 115B of a stateful server application may be configured to re-establish a specified set of connections, and/or to "replay" one or more entries in a log 170 (i.e., to re-send one or more logged packets to the client 140, and/or to re-receive one or more logged packets sent by the client 140), as described below.

If the server application is configured for stateless recovery (as detected in decision block 1330 of FIG. 13), CFD 120B may be configured to reestablish one or more connections by simulating the operations of a client during the initial connection establishment (block 1335). Various header fields containing connection state, such as packet sequence numbers, derived from entries saved in log 170 may be used by CFD 120B during connection reestablishment and recovery. As noted above, in some embodiments, CFD 120B may identify one or more connections to be reestablished, for example using entries in log 170, without having to receive a request from the failover version 115B of the server application identifying the connections. In some embodiments, one or more plugin modules may also be optionally implemented at CFD 120B, for example to simulate the client's role in a client-server handshake protocol (such as a login protocol) that may typically be used when a client actually connects to the server application (block 1340). Such a plugin module may be developed for any desired server application, and dynamically activated and/or deactivated at the CFD 120B as needed. After the connections have been reestablished and the plugins (if any have been configured) have completed handshake processing, stateless recovery may be complete (block 1345) in some embodiments. In other embodiments, additional steps not shown in FIG. 13 may be performed to complete stateless recovery.

If the server application is configured for stateful recovery, in some embodiments, CFD 120B may be configured to provide a list of the connections that were open at the time of the failure to the failover version 115B of the application (block 1350). The failover version 115B of the server application may be configured to request such a list, for example using a specific API supported by CFD 120B, in some embodiments. Upon receiving the list, failover version 115B of the server application may be configured to send one or more requests identifying specific connections to be recovered or reestablished. Upon receiving the reestablishment request or requests (block 1355), CFD 120B may be configured to simulate the functions of a client during the initial connection establishment for the specified connections (block 1360) (similar to the operations performed by CFD 120B corresponding to block 1335 for stateless recoveries). Connection state information such as sequence numbers may be obtained from entries in log 170 during connection reestablishment and recovery. The failover version 115B of the server application may then be configured to resume operations from a last-checkpointed or last-saved state in some embodiments, e.g., based on entries saved in a SASA 1401. The server application may request a replay or resend of one or more messages transmissions to client 170, where the contents of the some of the requested messages may have been saved earlier in log 170 (block 1365). Other messages being replayed by the server application may not have reached shadow server 130 prior to the failure, and so may not be present in log 170, or may not have been saved in log 170 for some other reason. In some embodiments, CFD 120B may be configured to ignore one or more replay requests (if, for example, the requested message had already been sent to the client 140 prior to the failure), and to resend other messages requested by the server application (block 1370).

As noted earlier, in some embodiments, network address translation (NAT) may be performed by shadow CFD 120B to support transparent application-level recovery of connections during failover. Such address translation may be provided by shadow CFD 120B during either stateless or stateful failover in various embodiments. For example, failover version 115A of the application may be assigned one or more new connection endpoints (e.g., sockets) for use in communicating with the client 140 in some embodiments. In such embodiments, shadow CFD 120B may be configured to provide network address translation (NAT) to translate a network address (e.g., a port number) and/or sequence numbers (TCP or other transport level sequence numbers) associated with newly assigned endpoints to match the network address and/or sequence numbers previously saved in log 170. The translation may hide or mask changes to the network address and/or sequence numbers, so that the failover of application 115 may be transparent to client 140 in such embodiments: e.g., client 140 may continue communication with the application as though application failover had not occurred.

Stateful recovery may be complete after all the message transmission or replay requests have been processed by CFD 120B (block 1345) in some embodiments, while in other embodiments one or more additional steps not shown in FIG. 13 may be performed to complete stateful recovery. It is noted that not all the steps shown in FIG. 13 may be performed for stateful or stateless recovery in some embodiments, and that some of the steps may be performed in a different order than the order shown in FIG. 13 in other embodiments. For example, the selection and establishment of contact with a new shadow server (block 1325) may be performed prior to authenticating the failover application (block 1320) in some embodiments. It is noted that because of the functions performed by CFD 120B (such as simulating the presence of a connected server application by maintaining one or more connections instead of allowing the connections to close) as described above, client 140 may not be made aware of a failure or of the failover of the server application. Thus, connection failovers may be accomplished in a manner transparent to the client, and without any modification of client networking software.

Figure 15:
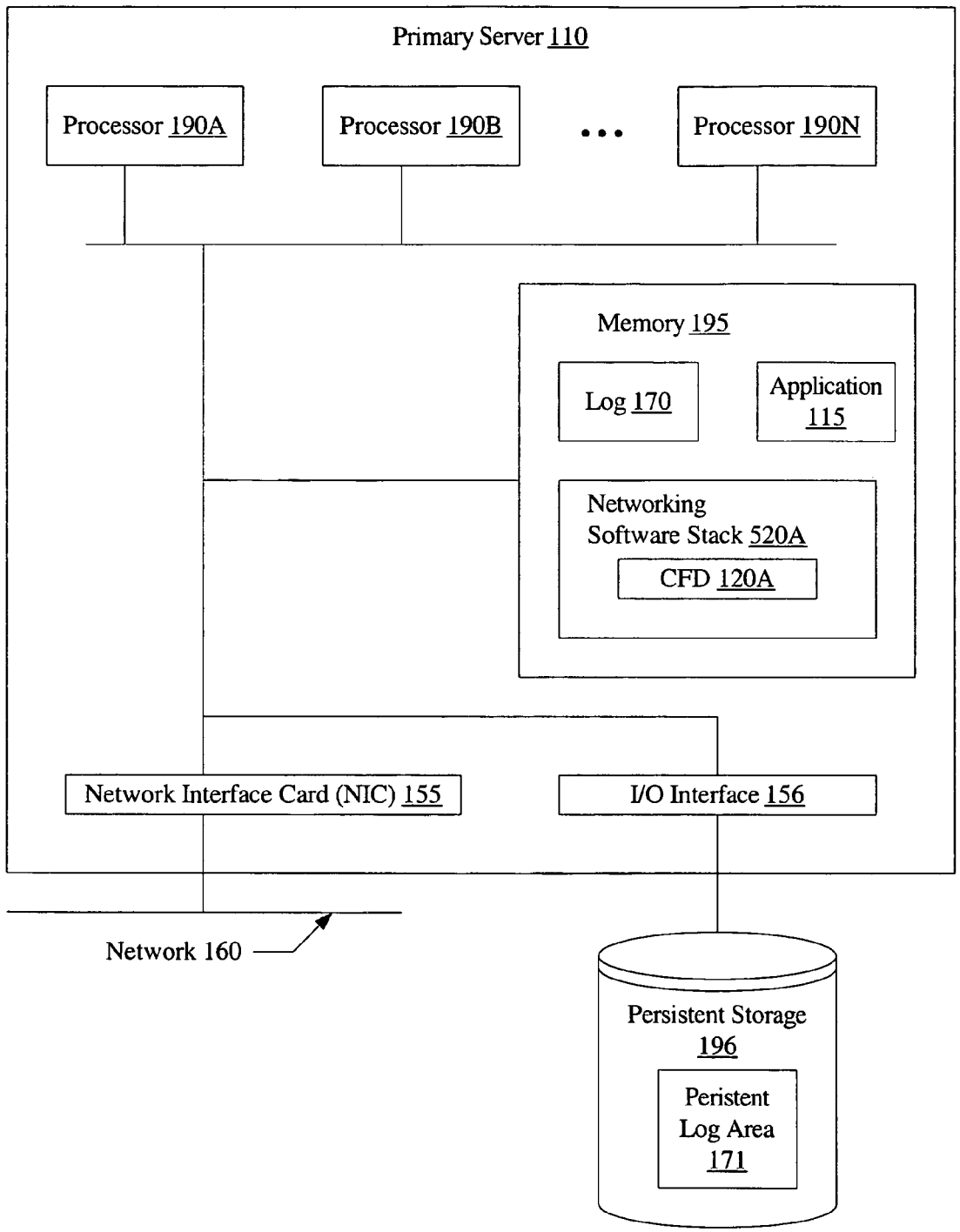
FIG. 15 is a block diagram illustrating constituent elements of a primary server, according to one embodiment.

FIG. 15 is a block diagram illustrating constituent elements of a primary server 110, according to one embodiment. As shown, primary server 110 may comprise one or more processors such as processors 190A, 190B, ..., 190N (collectively, processors 190) coupled to one or more memories such as memory 195. Processors 190 may be implemented using any desired architecture or chip set, such as the SPARC™ architecture from Sun Microsystems or the x86-compatible architectures from Intel Corporation, Advanced Micro Devices, etc. Part or all of log 170 may be incorporated within memory 195. Program instructions that may be executable to implement the functionality of server application 115 and/or networking software stack 520A (including primary CFD 120A) may be partly or fully resident within a memory 195 at a given point in time. Memory 195 may be implemented using any appropriate medium such as any of various types of RAM (e.g., DRAM, SDRAM, RDRAM, SRAM, etc.). Primary server 110 may also include one or more I/O interfaces 156 providing access to one or more persistent storage devices 196, and one or more network interface cards (NICs) 155 providing access to network 160. In some embodiments, part or all of log 170 may be stored within a persistent log area 171 of a storage device 196, and part or all of the program instructions that may be executable to implement the networking software stack 520 and server application 115 may also be present in a persistent storage device 196 at a given point in time.

A persistent storage device 196 may include any of a number of different types of storage devices, such as individual disks, disk arrays, optical devices such as CD-ROMs, CD-RW drives, DVD-ROMs, DVD-RW drives, flash memory devices, various types of RAM and the like. One or more storage devices 196 may be directly coupled to primary server 110 in some embodiments (e.g., using the Small Computer Systems Interface (SCSI) protocol), or may be accessible over any desired storage interconnect such as a fiber channel fabric or storage area network (SAN) in other embodiments. It is noted that shadow server 130 and any other additional servers used for connection failovers may also include the features illustrated in FIG. 15. In some embodiments, the operating system in use at the primary server 110 may differ from the operating system in use at the shadow server 130 and/or the operating system in use at client 140.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for enabling failover of a network connection to a client device, the system comprising:
   a primary server device including a primary connection failover driver; and
   a shadow server device including a shadow connection failover driver;
   wherein the primary server device and the shadow server device are coupled via a network;
   wherein the primary server device is configured to establish the network connection to the client device to enable communication between the client device and a server application executing on the primary server device;
   wherein the primary connection failover driver is configured to:
      receive a first plurality of message packets targeted for transmission over the network connection to the client device;
      redirect each message packet of the first plurality of message packets to the shadow server device;
   wherein the shadow connection failover driver is configured to:
      receive each respective message packet of the first plurality of message packets redirected by the primary connection failover driver;
      copy contents of each respective message packet of the first plurality of message packets to a log;
      forward each respective message packet of the first plurality of message packets to the client device;
   wherein the primary connection failover driver is further configured to:
      receive a second plurality of message packets from the client device;
      transmit a copy of each message packet of the second plurality of message packets to the shadow server device;
      receive a respective acknowledgement packet for acknowledging reception of each message packet of the second plurality of message packets, wherein each respective acknowledgement packet is targeted for transmission over the network connection to the client device;
      redirect the respective acknowledgement packet for each message packet of the second plurality of message packets to the shadow server device;
   wherein the shadow connection failover driver is further configured to perform the following for each particular message packet of the second plurality of message packets:
      receive the copy of the particular message packet transmitted by the primary connection failover driver;
      copy contents of the particular message packet to the log;
      receive the acknowledgement packet for the particular message packet redirected by the primary connection failover driver;
      forward the acknowledgement packet for the particular message packet to the client device in response to determining that the copy of the particular message packet was received from the primary connection failover driver;
   wherein the shadow server device is configured to:
      determine that a failure occurred in the network connection between the primary server device and the client device;
      in response to the failure, re-establish the network connection to the client device to enable communication between the client device and a failover version of the server application executing on the shadow server device, wherein in re-establishing the network connection, the shadow server device is configured to re-send one or more message packets of the first plurality of message packets to the client device using the contents of the first plurality of message packets copied to the log.

2. The system as recited in claim 1, wherein the network connection is established using the Transmission Control Protocol (TCP).

3. The system as recited in claim 1, wherein a networking software stack at the primary server device includes the primary connection failover driver in a layer below a transport layer.

4. The system as recited in claim 1, wherein the primary connection failover driver is configured to redirect the each respective message packet of the first plurality of message packets to the shadow server device according to a protocol that does not require an acknowledgment from the shadow server device of a reception of the respective message packet.

5. The system as recited in claim 4, wherein the protocol is the User Datagram Protocol (UDP).

6. The system as recited in claim 1, wherein at least a portion of the log is maintained within a volatile memory.

7. The system as recited in claim 6, wherein at least a subset of contents of the log are asynchronously copied to a non-volatile storage device.

8. A method for enabling failover of a network connection to a client device, the method comprising:
- a primary server device establishing the network connection to the client device to enable communication between the client device and a server application on the primary server device;
- a driver on the primary server device receiving a first plurality of message packets targeted for transmission over the network connection from the primary server device to the client device;
- the driver on the primary server device redirecting each message packet of the first plurality of message packets to a shadow server device;
- the shadow server device receiving each respective message packet of the first plurality of message packets redirected by the driver;
- the shadow server device copying contents of each respective message packet of the first plurality of message packets to a log accessible from the shadow server device;
- the shadow server device forwarding each respective message packet of the first plurality of message packets to the client device;
- the driver on the primary server device receiving a second plurality of message packets from the client device;
- the driver on the primary server device transmitting a copy of each message packet of the second plurality of message packets to the shadow server device;
- the driver on the primary server device receiving a respective acknowledgement packet for acknowledging reception of each message packet of the second plurality of message packets, wherein each respective acknowledgement packet is targeted for transmission over the network connection to the client device;
- the driver on the primary server device redirecting the respective acknowledgement packet for each message packet of the second plurality of message packets to the shadow server device;
- the shadow server device performing the following for each particular message packet of the second plurality of message packets:
  - receiving the copy of the particular message packet transmitted by the driver;
  - copying contents of the particular message packet to the log;
  - receiving the acknowledgement packet for the particular message packet redirected by the driver;
  - forwarding the acknowledgement packet for the particular message packet to the client device in response to determining that the copy of the particular message packet was received from the driver;
- the shadow server device determining that a failure occurred in the network connection between the primary server device and the client device; and
- in response to the failure, the shadow server device re-establishing the network connection to the client device to enable communication between the client device and a failover version of the server application on the shadow server device, wherein re-establishing the network connection includes the shadow server device re-sending one or more message packets of the first plurality of message packets to the client device using the contents of the first plurality of message packets copied to the log.

9. The method as recited in claim 8, wherein the primary server device includes a networking software stack comprising the driver in a layer below a transport layer.

10. The method as recited in claim 8, wherein each respective message packet of the first plurality of message packets is redirected to the shadow server device according to a protocol that does not require an acknowledgment from the shadow server device of a reception of the respective message packet.

11. A computer readable medium storing program instructions for enabling failover of a network connection to a client device, wherein the instructions are executable to implement:
- a primary server device establishing the network connection to the client device to enable communication between the client device and a server application on the primary server device;
- a driver on the primary server device receiving a first plurality of message packets targeted for transmission over the network connection from the primary server device to the client device;
- the driver on the primary server device redirecting each message packet of the first plurality of message packets to a shadow server device;
- the shadow server device receiving each respective message packet of the first plurality of message packets redirected by the driver;
- the shadow server device copying contents of each respective message packet of the first plurality of message packets to a log accessible from the shadow server device;
- the shadow server device forwarding each respective message packet of the first plurality of message packets to the client device;
- the driver on the primary server device receiving a second plurality of message packets from the client device;
- the driver on the primary server device transmitting a copy of each message packet of the second plurality of message packets to the shadow server device;
- the driver on the primary server device receiving a respective acknowledgement packet for acknowledging reception of each message packet of the second plurality of message packets, wherein each respective acknowledgement packet is targeted for transmission over the network connection to the client device;
- the driver on the primary server device redirecting the respective acknowledgement packet for each message packet of the second plurality of message packets to the shadow server device;
- the shadow server device performing the following for each particular message packet of the second plurality of message packets:
  - receiving the copy of the particular message packet transmitted by the driver;
  - copying contents of the particular message packet to the log;
  - receiving the acknowledgement packet for the particular message packet redirected by the driver;
  - forwarding the acknowledgement packet for the particular message packet to the client device in response to determining that the copy of the particular message packet was received from the driver;

the shadow server device determining that a failure occurred in the network connection between the primary server device and the client device; and in response to the failure, the shadow server device re-establishing the network connection to the client device to enable communication between the client device and a failover version of the server application on the shadow server device, wherein re-establishing the network connection includes the shadow server device re-sending one or more message packets of the first plurality of message packets to the client device using the contents of the first plurality of message packets copied to the log.

12. The computer readable medium as recited in claim 11, wherein the primary server device includes a networking software stack comprising the driver in a layer below a transport layer.

13. The computer readable medium as recited in claim 11, wherein each respective message packet of the first plurality of message packets is redirected to the shadow server device according to a protocol that does not require an acknowledgment from the shadow server device of a reception of the respective message packet.

14. The system as recited in claim 1, wherein in re-establishing the network connection, the shadow server device is configured to re-send one or more message packets of the second plurality of message packets to the failover version of the server application executing on the shadow server device using the contents of the second plurality of message packets copied to the log.

* * * * *

UNITED STATES PATENT AND TRADEMARK OFFICE
CERTIFICATE OF CORRECTION

PATENT NO.     : 7,668,962 B2
APPLICATION NO. : 11/052644
DATED          : February 23, 2010
INVENTOR(S)    : Tran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Seventh Day of December, 2010

David J. Kappos
*Director of the United States Patent and Trademark Office*